(12) United States Patent
Wheeler et al.

(10) Patent No.: US 9,026,581 B2
(45) Date of Patent: May 5, 2015

(54) MOBILE DEVICE AND METHOD OF OPERATING SAME TO INTERFACE CONTENT PROVIDER WEBSITE

(75) Inventors: Maxon R. Wheeler, San Jose, CA (US); William N. Camp, II, Mountain View, CA (US); Lien T. Mamitsuka, San Jose, CA (US); Christopher A. Mitra, Minneapolis, MN (US); Scott I. Putterman, Cupertino, CA (US); Kai Wei, San Jose, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 820 days.

(21) Appl. No.: 12/878,839

(22) Filed: Sep. 9, 2010

(65) Prior Publication Data

US 2011/0060793 A1 Mar. 10, 2011

Related U.S. Application Data

(60) Provisional application No. 61/241,291, filed on Sep. 10, 2009, provisional application No. 61/241,301, filed on Sep. 10, 2009, provisional application No. 61/241,129, filed on Sep. 10, 2009, provisional application No. 61/241,370, filed on Sep. 10, 2009, provisional application No. 61/241,144, filed on Sep. 10, 2009.

(51) Int. Cl.
*G06F 15/16* (2006.01)
*G06Q 10/00* (2012.01)

(52) U.S. Cl.
CPC ...................................... *G06Q 10/00* (2013.01)

(58) Field of Classification Search
USPC ................................................. 709/200, 203
See application file for complete search history.

(56) References Cited

U.S. PATENT DOCUMENTS

| 5,537,589 A | 7/1996 | Dalal |
| 6,035,323 A | 3/2000 | Narayen et al. |

(Continued)

FOREIGN PATENT DOCUMENTS

| CN | 103493469 A | 1/2014 |
| KR | 10-2007-0001906 A | 1/2007 |

(Continued)

OTHER PUBLICATIONS

PCT/US2010/048420; Notification of Transmittal of the International Search Report and The Written Opinion of the International Searching Authority, or the Declaration; Nov. 10, 2010; 11 pages.

(Continued)

*Primary Examiner* — Anthony Mejia

(57) ABSTRACT

In a mobile device, a method of interacting with a first social networking website by way of a network includes communicating indirectly with the first social networking website by interacting with an intermediate web server by way of the network, the intermediate web server in turn being in communication with the first social networking website. The method further includes determining, based at least in part upon a user input received at the mobile device, that the mobile device should communicate directly with the first social networking website in a manner not involving the intermediate web server. The method also includes communicating with the first social networking website directly in the manner not involving the intermediate web server. In another embodiment, the method relates to interacting with a plurality of social networking sites including a first social networking website and a second social networking site.

22 Claims, 8 Drawing Sheets

(56) References Cited

U.S. PATENT DOCUMENTS

| | | | |
|---|---|---|---|
| 6,229,534 B1 | 5/2001 | Gerra et al. | |
| 6,304,894 B1* | 10/2001 | Nakayama et al. | 709/203 |
| 6,513,026 B1 | 1/2003 | Horvitz et al. | |
| 6,601,012 B1 | 7/2003 | Horvitz et al. | |
| 6,687,732 B1* | 2/2004 | Bector et al. | 709/200 |
| 6,801,603 B1 | 10/2004 | Arev et al. | |
| 7,249,159 B1 | 7/2007 | Horvitz et al. | |
| 7,359,737 B2 | 4/2008 | Ishii | |
| 7,379,760 B2 | 5/2008 | Ishii | |
| 7,417,650 B1 | 8/2008 | Horvitz | |
| 7,461,094 B2 | 12/2008 | Morris et al. | |
| 7,502,795 B1 | 3/2009 | Svendsen et al. | |
| 7,523,138 B2 | 4/2009 | Gruhl et al. | |
| 7,529,797 B2 | 5/2009 | Tseng et al. | |
| 7,574,653 B2 | 8/2009 | Croney et al. | |
| 7,617,220 B2 | 11/2009 | Crowley et al. | |
| 7,673,327 B1* | 3/2010 | Polis et al. | 726/5 |
| 7,693,953 B2 | 4/2010 | Middleton et al. | |
| 7,769,764 B2 | 8/2010 | Ramer et al. | |
| 7,779,073 B2* | 8/2010 | Hoile et al. | 709/204 |
| 7,797,732 B2* | 9/2010 | Tam et al. | 726/3 |
| 7,814,537 B2* | 10/2010 | Fredell | 726/8 |
| 7,853,558 B2 | 12/2010 | Brindley | |
| 7,886,000 B1 | 2/2011 | Polis et al. | |
| 7,899,455 B2 | 3/2011 | Ramer et al. | |
| 7,908,647 B1 | 3/2011 | Polis et al. | |
| 8,027,874 B2 | 9/2011 | Angles et al. | |
| 8,041,717 B2 | 10/2011 | Ramer et al. | |
| 8,131,767 B2 | 3/2012 | Brindley | |
| 8,204,952 B2 | 6/2012 | Stremel et al. | |
| 8,208,947 B2 | 6/2012 | Yasrebi et al. | |
| 8,224,298 B2* | 7/2012 | Smith et al. | 455/414.1 |
| 8,234,193 B2* | 7/2012 | Ransom et al. | 705/35 |
| 8,250,153 B2 | 8/2012 | Kamat | |
| 8,266,154 B2 | 9/2012 | Guo et al. | |
| 8,275,796 B2 | 9/2012 | Spivack et al. | |
| 8,295,819 B1 | 10/2012 | Kaplan et al. | |
| 8,489,132 B2 | 7/2013 | Karmarkar et al. | |
| 8,504,711 B1 | 8/2013 | Lunt | |
| 8,543,731 B2* | 9/2013 | Lu et al. | 709/244 |
| 8,589,495 B1* | 11/2013 | Beckert | 709/206 |
| 8,621,037 B2* | 12/2013 | Li et al. | 709/217 |
| 2001/0034771 A1* | 10/2001 | Hutsch et al. | 709/217 |
| 2002/0058522 A1 | 5/2002 | Kim et al. | |
| 2002/0078180 A1* | 6/2002 | Miyazawa | 709/219 |
| 2002/0090932 A1 | 7/2002 | Bhatia et al. | |
| 2002/0095312 A1 | 7/2002 | Wheat | |
| 2002/0112001 A1 | 8/2002 | Sutherland et al. | |
| 2002/0154759 A1 | 10/2002 | Ishii | |
| 2003/0004880 A1 | 1/2003 | Banerjee et al. | |
| 2003/0163536 A1 | 8/2003 | Pettine, Jr. | |
| 2003/0167264 A1 | 9/2003 | Agura et al. | |
| 2004/0103158 A1 | 5/2004 | Vella et al. | |
| 2004/0210637 A1 | 10/2004 | Loveland | |
| 2004/0229635 A1 | 11/2004 | Hertz | |
| 2004/0244102 A1 | 12/2004 | Benzon et al. | |
| 2005/0182767 A1 | 8/2005 | Shoemaker et al. | |
| 2005/0198305 A1 | 9/2005 | Pezaris et al. | |
| 2005/0209927 A1 | 9/2005 | Aaltonen et al. | |
| 2005/0216550 A1* | 9/2005 | Paseman et al. | 709/202 |
| 2005/0264845 A1 | 12/2005 | Edwards et al. | |
| 2006/0007902 A1* | 1/2006 | Heller | 370/338 |
| 2006/0010225 A1 | 1/2006 | Issa | |
| 2006/0036674 A1 | 2/2006 | Walden et al. | |
| 2006/0128404 A1 | 6/2006 | Klassen et al. | |
| 2006/0155698 A1 | 7/2006 | Vayssiere | |
| 2006/0183097 A1 | 8/2006 | Ishii | |
| 2006/0224739 A1* | 10/2006 | Anantha | 709/226 |
| 2006/0271384 A1* | 11/2006 | Munson et al. | 705/1 |
| 2007/0027857 A1* | 2/2007 | Deng et al. | 707/3 |
| 2007/0033255 A1 | 2/2007 | Sanjeeva et al. | |
| 2007/0073837 A1 | 3/2007 | Johnson-McCormick et al. | |
| 2007/0094276 A1 | 4/2007 | Isaac | |
| 2007/0094390 A1* | 4/2007 | Nussey | 709/225 |
| 2007/0118425 A1 | 5/2007 | Yruski et al. | |
| 2007/0121821 A1 | 5/2007 | Su | |
| 2007/0157110 A1* | 7/2007 | Gandhi et al. | 715/779 |
| 2007/0219910 A1* | 9/2007 | Martinez | 705/51 |
| 2007/0230374 A1 | 10/2007 | Altberg et al. | |
| 2007/0239874 A1 | 10/2007 | Lazaridis | |
| 2007/0240072 A1 | 10/2007 | Cunningham et al. | |
| 2007/0282959 A1 | 12/2007 | Stern | |
| 2007/0288636 A1 | 12/2007 | Rogers et al. | |
| 2007/0288836 A1 | 12/2007 | Partovi | |
| 2008/0016245 A1 | 1/2008 | Cunningham et al. | |
| 2008/0034064 A1 | 2/2008 | Choi et al. | |
| 2008/0086319 A1 | 4/2008 | Berger | |
| 2008/0133525 A1 | 6/2008 | Ott | |
| 2008/0148366 A1 | 6/2008 | Wahl | |
| 2008/0155112 A1 | 6/2008 | Ma | |
| 2008/0162260 A1* | 7/2008 | Rohan et al. | 705/10 |
| 2008/0168381 A1 | 7/2008 | Nelson et al. | |
| 2008/0172458 A1* | 7/2008 | Middleton et al. | 709/203 |
| 2008/0189395 A1 | 8/2008 | Stremel et al. | |
| 2008/0242370 A1 | 10/2008 | Lando et al. | |
| 2008/0256170 A1* | 10/2008 | Hayashi et al. | 709/201 |
| 2008/0256198 A1 | 10/2008 | Kamat | |
| 2008/0258913 A1* | 10/2008 | Busey | 340/540 |
| 2008/0267218 A1 | 10/2008 | Linnamaki | |
| 2008/0301233 A1* | 12/2008 | Choi | 709/205 |
| 2008/0306974 A1 | 12/2008 | Van Steenbergen et al. | |
| 2008/0320040 A1* | 12/2008 | Zhurakhinskaya | 707/104.1 |
| 2009/0006642 A1 | 1/2009 | Dickens et al. | |
| 2009/0007244 A1 | 1/2009 | Monahan et al. | 726/5 |
| 2009/0037566 A1* | 2/2009 | Hoile et al. | 709/223 |
| 2009/0044142 A1 | 2/2009 | Faris et al. | |
| 2009/0070412 A1* | 3/2009 | D'Angelo et al. | 709/203 |
| 2009/0111490 A1 | 4/2009 | Bell et al. | |
| 2009/0113975 A1 | 5/2009 | Eddens | |
| 2009/0119375 A1* | 5/2009 | Shenfield | 709/206 |
| 2009/0125544 A1 | 5/2009 | Brindley | |
| 2009/0138477 A1 | 5/2009 | Piira et al. | |
| 2009/0143052 A1* | 6/2009 | Bates et al. | 455/414.2 |
| 2009/0144392 A1 | 6/2009 | Wang et al. | |
| 2009/0187820 A1* | 7/2009 | Stinson et al. | 715/238 |
| 2009/0204666 A1* | 8/2009 | Sana et al. | 709/203 |
| 2009/0210514 A1* | 8/2009 | Davis et al. | 709/219 |
| 2009/0217475 A1 | 9/2009 | Broman et al. | |
| 2009/0238538 A1 | 9/2009 | Fink | |
| 2009/0240807 A1 | 9/2009 | Munson et al. | |
| 2009/0259971 A1 | 10/2009 | Rankine et al. | |
| 2009/0271475 A1* | 10/2009 | Grin et al. | 709/202 |
| 2009/0287701 A1* | 11/2009 | Breaker et al. | 707/7 |
| 2009/0298480 A1 | 12/2009 | Khambete et al. | |
| 2009/0299963 A1* | 12/2009 | Pippuri | 707/3 |
| 2009/0300139 A1 | 12/2009 | Shoemaker et al. | |
| 2009/0307715 A1* | 12/2009 | Santamaria et al. | 719/318 |
| 2009/0319513 A1 | 12/2009 | Westerfeld et al. | |
| 2009/0320077 A1 | 12/2009 | Gazdzinski | |
| 2010/0005520 A1* | 1/2010 | Abbot et al. | 726/6 |
| 2010/0011425 A1 | 1/2010 | Eyal | |
| 2010/0011431 A1 | 1/2010 | Cynkin et al. | 726/9 |
| 2010/0049810 A1 | 2/2010 | Maeda | |
| 2010/0080410 A1 | 4/2010 | Deluca et al. | |
| 2010/0082576 A1 | 4/2010 | Walker et al. | |
| 2010/0100952 A1* | 4/2010 | Sample et al. | 726/9 |
| 2010/0114946 A1 | 5/2010 | Kumar et al. | |
| 2010/0145924 A1* | 6/2010 | Zabramski et al. | 707/709 |
| 2010/0179915 A1 | 7/2010 | Nastacio | |
| 2010/0192207 A1 | 7/2010 | Raleigh | |
| 2010/0205211 A1 | 8/2010 | Ghosh | |
| 2010/0205221 A1 | 8/2010 | Shaw et al. | |
| 2010/0205279 A1 | 8/2010 | Takakura | |
| 2010/0211651 A1 | 8/2010 | Guedalia et al. | |
| 2010/0217834 A1 | 8/2010 | Woodcock et al. | |
| 2010/0223066 A1 | 9/2010 | Berger | |
| 2010/0235329 A1 | 9/2010 | Koren et al. | |
| 2010/0241755 A1 | 9/2010 | Bassett et al. | |
| 2010/0250648 A1* | 9/2010 | Cao et al. | 709/203 |
| 2010/0266167 A1 | 10/2010 | Kodesh et al. | |
| 2010/0287053 A1 | 11/2010 | Ganong et al. | |
| 2010/0293105 A1 | 11/2010 | Blinn et al. | |
| 2010/0299453 A1* | 11/2010 | Fox et al. | 709/246 |
| 2010/0299455 A1* | 11/2010 | Master et al. | 709/248 |

(56) References Cited

U.S. PATENT DOCUMENTS

| | | | |
|---|---|---|---|
| 2010/0306249 A1 | 12/2010 | Hill et al. | |
| 2010/0318925 A1* | 12/2010 | Sethi et al. | 715/760 |
| 2010/0325194 A1* | 12/2010 | Williamson et al. | 709/203 |
| 2010/0332958 A1 | 12/2010 | Weinberger et al. | |
| 2011/0016176 A1 | 1/2011 | Roberts | |
| 2011/0016197 A1* | 1/2011 | Shiimori et al. | 709/219 |
| 2011/0022476 A1 | 1/2011 | Barkley et al. | |
| 2011/0047229 A1* | 2/2011 | Sinha et al. | 709/206 |
| 2011/0055209 A1 | 3/2011 | Novac et al. | |
| 2011/0060793 A1 | 3/2011 | Wheeler et al. | |
| 2011/0061091 A1 | 3/2011 | Wheeler et al. | |
| 2011/0087652 A1* | 4/2011 | Westin et al. | 707/722 |
| 2011/0113086 A1* | 5/2011 | Long et al. | 709/203 |
| 2011/0150362 A1 | 6/2011 | Mitra et al. | |
| 2011/0179378 A1 | 7/2011 | Wheeler et al. | |
| 2011/0184780 A1* | 7/2011 | Alderson et al. | 705/7.32 |
| 2011/0191406 A1 | 8/2011 | Plunkett et al. | |
| 2011/0197123 A1 | 8/2011 | Caine et al. | |
| 2011/0231478 A1 | 9/2011 | Wheeler et al. | |
| 2011/0282867 A1 | 11/2011 | Palermiti, II et al. | |
| 2012/0042236 A1 | 2/2012 | Adler, III et al. | |
| 2012/0066286 A1 | 3/2012 | Heredia et al. | |
| 2012/0072494 A1* | 3/2012 | Wong et al. | 709/204 |
| 2012/0110429 A1 | 5/2012 | Tzonis et al. | |
| 2012/0117167 A1* | 5/2012 | Sadja et al. | 709/206 |
| 2012/0130834 A1 | 5/2012 | Landry | |
| 2012/0144317 A1 | 6/2012 | Balasurbramanian et al. | |
| 2012/0203651 A1 | 8/2012 | Leggatt | |
| 2012/0290601 A1 | 11/2012 | Huang | |
| 2012/0311029 A1* | 12/2012 | Schuster et al. | 709/204 |
| 2012/0331141 A1 | 12/2012 | Carter et al. | |
| 2013/0036155 A1 | 2/2013 | Shaw et al. | |
| 2013/0091204 A1* | 4/2013 | Loh et al. | 709/204 |
| 2013/0097279 A1* | 4/2013 | Polis et al. | 709/217 |

FOREIGN PATENT DOCUMENTS

| | | | |
|---|---|---|---|
| WO | 0148985 A1 | 7/2001 | |
| WO | 0169387 A2 | 9/2001 | |
| WO | 2005048073 A2 | 5/2005 | |
| WO | 2007022513 A2 | 2/2007 | |
| WO | 2008020312 A2 | 2/2008 | |
| WO | 2008094154 A1 | 8/2008 | |
| WO | 2008/112805 A1 | 9/2008 | |
| WO | 2008131452 A1 | 10/2008 | |
| WO | 2009/039509 A2 | 3/2009 | |
| WO | 2009036470 A9 | 3/2009 | |
| WO | 2011031962 A1 | 3/2011 | |
| WO | 2011063859 A1 | 6/2011 | |

OTHER PUBLICATIONS

PCT/US2010/048429; Notification of Transmittal of the International Search Report and The Written Opinion of the International Searching Authority, or the Declaration; Jan. 20, 2011; 13 pages.

Blackberry Communication Flow; XP-002611054; Sep. 7, 2004; 1 page.

Feature and Technical Overview, Blackberry Enterprise Server for IBM Lotus Domino, Version 4.1/ Service Pack 6; 2008; 80 pages.

Push e-mail; Wikipedia.com; XP-002611056; Sep. 3, 2009; 8 pages.

Mitchell, S.; Updates to the TextBox Word / Character Counter Control; www.4guysfromrolla.com/articles/010709-1.aspx; XP-002611057; Jan. 7, 2009; 6 pages.

BlackBerry Mobile Data System, Technical Overview; XP-002611058; 2006; Research in Motion Limited; 22 pages.

Proxy Server; Wikipedia.com; XP-002611059; Sep. 8, 2009; 10 pages.

Duke, L.; BlackBerry for Home Users; Understanding BlackBerry Internet Service (BIS); Suite 101®.com; Jul. 19, 2008; 1 page.

Adium; Wikipedia.com; Sep. 7, 2009; 4 pages.

PCT/US2010/047073 Notification of Transmittal of the International Search Report and the Written Opinion of the International Searching Authority, or the Declaration; Dec. 6, 2010; 10 pages.

PCT/US2010/045442 Notification of Transmittal of the International Search Report and the Written Opinion of the International Searching Authority, or the Declaration; Dec. 6, 2010; 12 pages.

Yahoo Go for Mobile; Yahoo Go for Mobile Online Software & Service reviews—CNET Reviews; http://reviews.cnet.com/online-software-services/yahoo-go-for-mobile/4505-9239_7-31849319.html; 2006; 3 pages.

Yahoo Go for TV beta; Yahoo Go for TV beta Online Software & Service reviews—CNET Reviews; http://reviews.cnet.com/online-software-services/yahoo-go-for-tv/4505-9239_7-31855439.html; 2006; 3 pages.

Yahoo!® Go 3.0 Announced at CES—ReadWriteWeb; Yahoo! Go 3.0 Announced at CES—is Yahoo! Back in '08?; http://www.readwriteweb.com/archives/yahoo_life_and_go_3_ces.php; 2007; 2 pages.

Yahoo! Go for Mobile 2.0 (gamma); Killer Apps for Mobile Phones; Aug. 2008; http://www.pcmag.com/print_article2/0,1217,a%253D209042,00.asp; 19 pages.

Yahoo! for Mobile. Your favorite Yahoo! services, on our phone; http://mobile.yahoo.com; available on or before Jun. 9, 2010; 1 page.

SMS Tools—Free software downloads and software reviews—CNET Download.com; http://download.cnet.com/windows/sms-tools/ available on or before Jun. 9, 2010; 5 pages.

Yahoo! Go—Wikipedia, the free encyclopedia; Yahoo! Go; http://en.wikipedia.org/wiki/Yahoo!_Go; available on or before Jun. 9, 2010; 1 page.

U.S. Appl. No. 61/241,301, filed Sep. 9, 2009, provisional patent application.

U.S. Appl. No. 61/241,129, filed Sep. 9, 2009, provisional patent application.

U.S. Appl. No. 61/241,370, filed Sep. 9, 2009, provisional patent application.

U.S. Appl. No. 61/241,144, filed Sep. 9, 2009, provisional patent application.

United States Patent & Trademark Office, Non-Final Office Action for U.S. Appl. No. 12/878,702 dated Feb. 5, 2013, 17 pages.

United States Patent and Trademark Office, "Non-Final Rejection" for U.S. Appl. No. 12/878,778 dated Nov. 7, 2012, 8 pages.

United States Patent & Trademark Office, Notice of Allowance and Fee(s) Due for U.S. Appl. No. 12/878,702 dated Nov. 8, 2013, 15 pages.

United States Patent and Trademark Office, Non-Final Rejection for U.S. Appl. No. 12/972,818 dated Mar. 14, 2013, 14 pages.

United States Patent & Trademark Office, Final Rejection for U.S. Appl. No. 12/878,705 dated Sep. 13, 2013, 19 pages.

United States Patent and Trademark Office, "Non-Final Rejection" for U.S. Appl. No. 12/972,787 dated Oct. 2, 2013, 19 pages.

United States Patent and Trademark Office, "Non-Final Rejection" for U.S. Appl. No. 12/878,707; May 7, 2012; 7 pages.

U.S. Appl. No. 12/972,787; "Method and System for Facilitating Interaction with Multiple Content Provider Websites" filed Dec. 20, 2010.

International Application No. PCT/US2011/063859; "Notification of Transmittal of International Search Report and Written Opinion of International Searching Authority"; Mar. 6, 2012; 12 pages.

U.S. Appl. No. 12/972,818; "Method and System for Facilitating Interaction with Multiple Content Provider Websites"; filed Dec. 20, 2010.

Differitas Network Norway; Content Provider API-SMS; Implementation Guide Version 1.6; © 2006-2007; 59 pages.

Multiply—Secure, Family-Friendly Media Sharing; "Sharing & Shopping with your Friends"; http://multiply.com; accessed from the web on Aug. 29, 2011; 1 page.

Ogasawara, Todd; "The Reason for the 10 Character Text Message and 140 Character Twitter Length Limits"; SocialTimes.com; May 4, 2009; 4 pages.

Brown, Jeff et al.; University of North Carolina Wilmington; "SMS: The Short Message Service"; Dec. 2007; pp. 106-110.

Patent Cooperation Treaty, "PCT Search Report and Written Opinion of the International Searching Authority" for International Application No. PCT/US2011/064031 dated Jun. 12, 2012, 12 pages.

(56) References Cited

OTHER PUBLICATIONS

United States Patent & Trademark Office, "Notice of Allowance and Fee(s) Due" for U.S. Appl. No. 12/878,702 dated Mar. 18, 2014, 6 pages.
United States Patent and Trademark Office, "Non-Final Rejection" for U.S. Appl. No. 12/972,818 dated Apr. 7, 2014, 11 pages.
KIPO, "Notice of Preliminary Rejection" for Korean Patent Application No. 10-2012-7009179 dated Apr. 29, 2014, 3 pages (translated).
Wikipedia, "Push E-Mail" (Sep. 3, 2009); retrieved from http://en.wikipedia.org/w/index.php? title=Push_email&oldid=311724632.
United States Patent & Trademark Office, Non-Final Office Action for U.S. Appl. No. 12/878,705 dated Dec. 21, 2012, 17 pages.
Anonymous: "Proxy server" [Online] 8 Sep. 2009, XP002611059 Wikipedia, the free encyclopedia. Retrieved from the Internet: URL:http://en.wikipedia.org/w/index.php?title=Proxy_server&oldid=312641025&printable=yes> [retrieved on Nov. 22, 2010].
Wheeler et al., "System, Server, and Mobile Device for Content Provider Website Interaction and Method Therefore" U.S. Appl. No. 12/878,705, filed Sep. 9. 2010.
Mitra et al., "Method for Exchanging Photos With Interface Content Provider Website" U.S. Appl. No. 12/878,702, filed Sep. 9, 2010.
Hangas et al., "Method Generating a Message for One or More Social Networking Websites" U.S. Appl. No. 12/878,707, filed Sep. 9, 2010.
Wheeler et al., "Method and System for Intermediating Content Provider Website and Mobile Device" U.S. Appl. No. 12/878,702, filed Sep. 9, 2010.
Office Action for KR Application No. 10-2013-7015884, mailed Jun. 27, 2014, 6 pages.
Non-Final Office Action for U.S. Appl. No. 12/972,818, mailed Sep. 11, 2014, 14 pages.
Office Action Response for KR Application No. 10-2013-7015884, filed Aug. 27, 2014, 28 pages.
Office Action Response for MX Application No. MX/a/2013/007034, filed Aug. 22, 2014, 21 pages.
Office Action for MX Application No. MX/a/2013/007034, mailed May 12, 2014, 3 pages.

* cited by examiner

MOBILE DEVICE AND METHOD OF OPERATING SAME TO INTERFACE CONTENT PROVIDER WEBSITE

CROSS-REFERENCE TO RELATED APPLICATIONS

This application claims the benefit of each of the following U.S. provisional patent applications, each of which is hereby incorporated by reference herein: U.S. Provisional Patent Application No. 61/241,291, titled "Mobile Device and Method of Operating Same to Interface Content Provider Website" and filed on Sep. 10, 2009; U.S. Provisional Patent Application No. 61/241,301, titled "Method and System for Intermediating Content Provider Website and Mobile Device" and filed on Sep. 10, 2009; U.S. Provisional Patent Application No. 61/241,129, titled "Method of Exchanging Photos With Interface Content Provider Website" and filed on Sep. 10, 2009; U.S. Provisional Patent Application No. 61/241,370, titled "System, Server and Mobile Device for Content Provider Website Interaction and Method Therefore" and filed on Sep. 10, 2009; and U.S. Provisional Patent Application No. 61/241,144, titled "Method Generating a Message for One or More Social Networking Websites" and filed on Sep. 10, 2009.

FIELD OF THE INVENTION

The present invention relates to communications involving mobile devices and, more particularly, to communications between such mobile devices and internet content provider websites.

BACKGROUND OF THE INVENTION

Content provider websites (CPWs), such as social networking websites (SNWs), news feeds, music and photograph websites, as well as other types of websites such as business-to-business (b2b) or business-to-consumer (b2c) websites, are interactive websites that allow for the downloading and/or uploading (e.g., posting) of various forms of data, such as news, weather, personal and/or business information, pictures, videos, and songs and thereby facilitate the creation and maintaining of interpersonal connections among persons and groups of persons. The uploading of data to a CPW by one user can allow other users to access and/or download the uploaded data. Typically, a SNW provides the architecture for countless users to create respective personal or professional spaces that respectively identify the respective users and allow uploaded data to be associated with the respective spaces.

CPWs can be in communication with users who are operating any of a variety of different types of devices, which are in contact with the CPWs often by way of internet-type networks. Increasingly, users employ mobile devices to interact with the CPWs. As such communications activities increase, there is developing an increased need for improving the quality and/or user-friendliness in conducting such communications activities. Further, there is also developing an increased need for improving the efficiency of such communications activities to improve battery performance of mobile devices and reduce data transmissions for all devices.

It would therefore be advantageous if improvements, in the form of improved mobile devices and/or other devices, and/or improved methods for allowing mobile devices to communicate with CPWs, can be provided that will help to address, at least partly, one or more of the aforementioned developing needs.

SUMMARY OF THE INVENTION

In at least one embodiment, the present invention relates to a method in a mobile device, where the method is for interacting with a first social networking website by way of a network. The method includes (a) communicating indirectly with the first social networking website by interacting with an intermediate web server by way of the network, the intermediate web server in turn being in communication with the first social networking website, and (b) receiving from the intermediate web server, notifications and first information, wherein the mobile device receives at least some of the notifications in an asynchronous manner off of the network via a push channel from the web server at times determined by the intermediate web server, and wherein the mobile device receives the first information following a pull request. The method further includes (c) determining, based at least in part upon a user input received at the mobile device, that the mobile device should communicate directly with the first social networking website in a manner not involving the intermediate web server; and (d) communicating with the first social networking website directly in the manner not involving the intermediate web server.

In another embodiment, the present invention relates to a method in a mobile device, where the method is for communicating with a first social networking site by way of a network and an intermediate web server. The method includes establishing a push channel over the network by which the mobile device is capable of receiving communications from the intermediate web server, and receiving first information off of the network arriving from the intermediate web server, the first information being communicated over the network over the push channel at a first time determined by the intermediate web server. The method additionally includes receiving second information off of the network arriving from the intermediate web server, the second information being communicated at a second time, wherein at least some of each of the first information and the second information has originated from the first social networking site, and establishing an additional communication link over the network by which the mobile device is capable of directly communicating with the first social networking site without communicating with the intermediate web server.

DETAILED DESCRIPTION OF THE INVENTION

Figure 1:
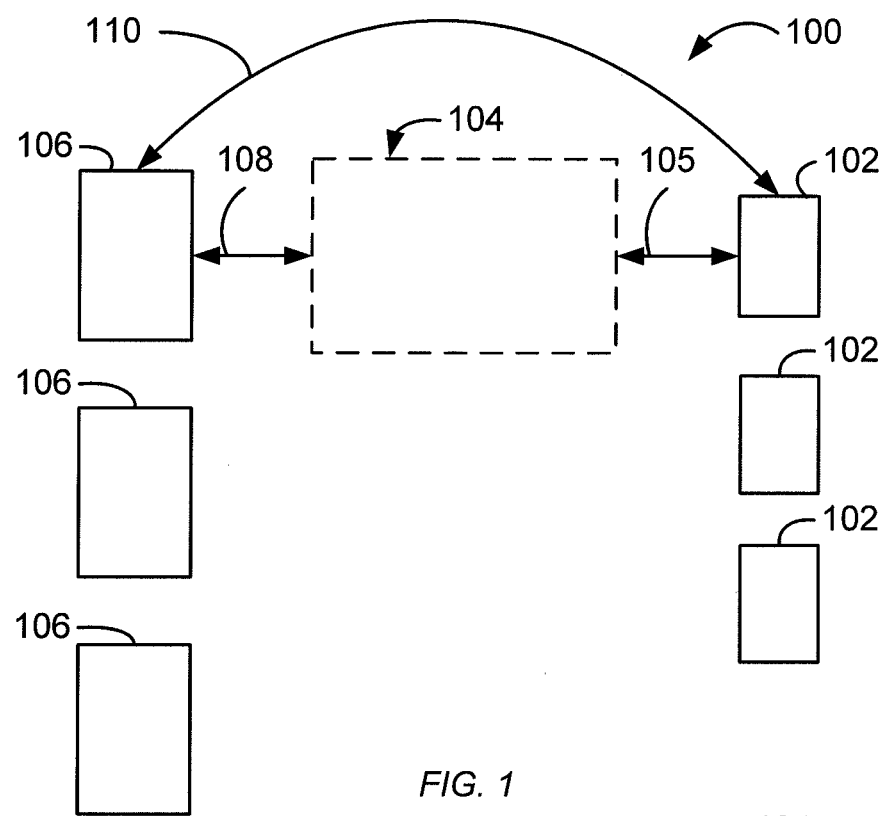
FIG. 1 shows in schematic form an example communications system involving a plurality of mobile devices in communication with a plurality of content provider websites, where some of the communications occur via an intermediary web server.

Referring to FIG. 1, a block diagram of an example communications system 100 is shown in a simplified schematic form. As shown, the communications system 100 includes in this embodiment three mobile devices 102, one of which is shown to be in communication via a communication link 105 with a server, which in the present embodiment is a web server 104. The mobile devices 102 are respectively representative of communication devices operated by persons (or users) or possibly by other entities (e.g., netbooks or other computers) desiring or requiring communication capabilities. In some embodiments, for example, the mobile devices can be any of cellular telephones, other wireless devices such as personal digital assistants, and/or devices such as laptops and desktop computers that are capable of connecting to and communicating with a network.

The communications system 100 additionally is shown to include three content provider websites (CPWs) 106, one of which is shown to be in communication with the intermediary web server 104 via a communication link 108. Further, a communication link 110 is also provided that allows for that one of the mobile devices 102 that is in communication with the web server 104 to directly communicate with that one of the CPWs 106 that is also in communication with the web server, without the intermediation of the web server 104. Although only one of the mobile devices 102 and one of the CPWs 106 are shown in to be in communication with the web server 104, it will be understood that depending upon the time or operational circumstance, any or all of the mobile devices 102 and CPWs 106 can be in communication with the web server. Likewise, depending upon the time or operational circumstance, any of the mobile devices 102 can enter into communication with any of the CPWs 106 by way of direct communication links such as the link 110.

Although three mobile devices 102 are shown in FIG. 1, in other embodiments only one mobile device is present in communication with the web server 104, or alternatively any arbitrary number of mobile devices can be in communication with the web server 104. Likewise, although three CPWs 106 are shown in FIG. 1, in other embodiments only one CPW is in communication with the web server 104, or alternatively any arbitrary number of CPWs can be in communication with the web server 104. Additionally, any arbitrary number of mobile device(s) can be in communication with any arbitrary number of CPW(s) by way of direct communication links such as the link 110 in other embodiments. That is, FIG. 1 is intended to be representative of any of a variety of systems employing any arbitrary number of mobile devices and any arbitrary number of CPWs that are in communication with one another either indirectly via a web server interface or directly with one another.

Depending upon the embodiment, the communication links 105, 108, 110 can be part of a single network or multiple networks, and each link can include one or more wired and/or wireless communication pathways, for example, landline (e.g., fiber optic, copper) wiring, microwave communication, radio channel, wireless path, intranet, internet, and/or World Wide Web communication pathways (which themselves can employ numerous intermediary hardware and/or software devices including, for example, numerous routers, etc.). In addition, a variety of communication protocols and methodologies can be used to conduct the communications via the communication links 105, 108, 110 between the mobile devices 102, web server 104, and CPWs 106, including for example, transmission control protocol/internet protocol (TCP/IP), extensible messaging and presence protocol (XMPP), file transfer protocol (FTP), etc. In other embodiments, other types of communication links for facilitating the transfer of signals between the plurality of mobile devices 102 and the CPWs 106 can be utilized as well. Although in the present embodiment the communication links/network and server are each discussed as being web-based, in other embodiments, the links/network and server can assume various non-web-based forms.

As will be discussed below in more detail with regard to FIGS. 4-7, the web server 104 is configured to serve as an intermediary between the mobile devices 102 and the CPWs 106. Various types of communications between the mobile devices 102 and CPWs 106 are passed through, processed and/or monitored by the web server 104 including, for example, communications involving the uploading and downloading of files (e.g. photos, music, videos, text entries, etc.), blog postings, and messaging (e.g., short Message Service (SMS), Multimedia Messaging Service (MMS), and Instant Messaging (IM)). The CPWs are generally intended to encompass a variety of interactive websites that allow for the downloading and uploading (e.g., posting) of various forms of data, such as personal and/or business information, pictures, videos, and songs and thereby facilitate the creation and maintaining of interpersonal connections among persons and groups of persons. Examples of CPWs include, for example, Facebook™, MySpace™, hi5™, LinkedIn™, and Twitter™. For purposes of the present invention, CPWs can also be understood to encompass various other types of websites (e.g., business-to-business or business-to-consumer websites) that, while not focused entirely or predominantly upon social networking, nevertheless also include social networking-type features. Other content provider websites include sources of RSS or other news feeds, photograph services such as Picasa™ or Photobucket™, and music services such as LastFM™.

Figure 2:
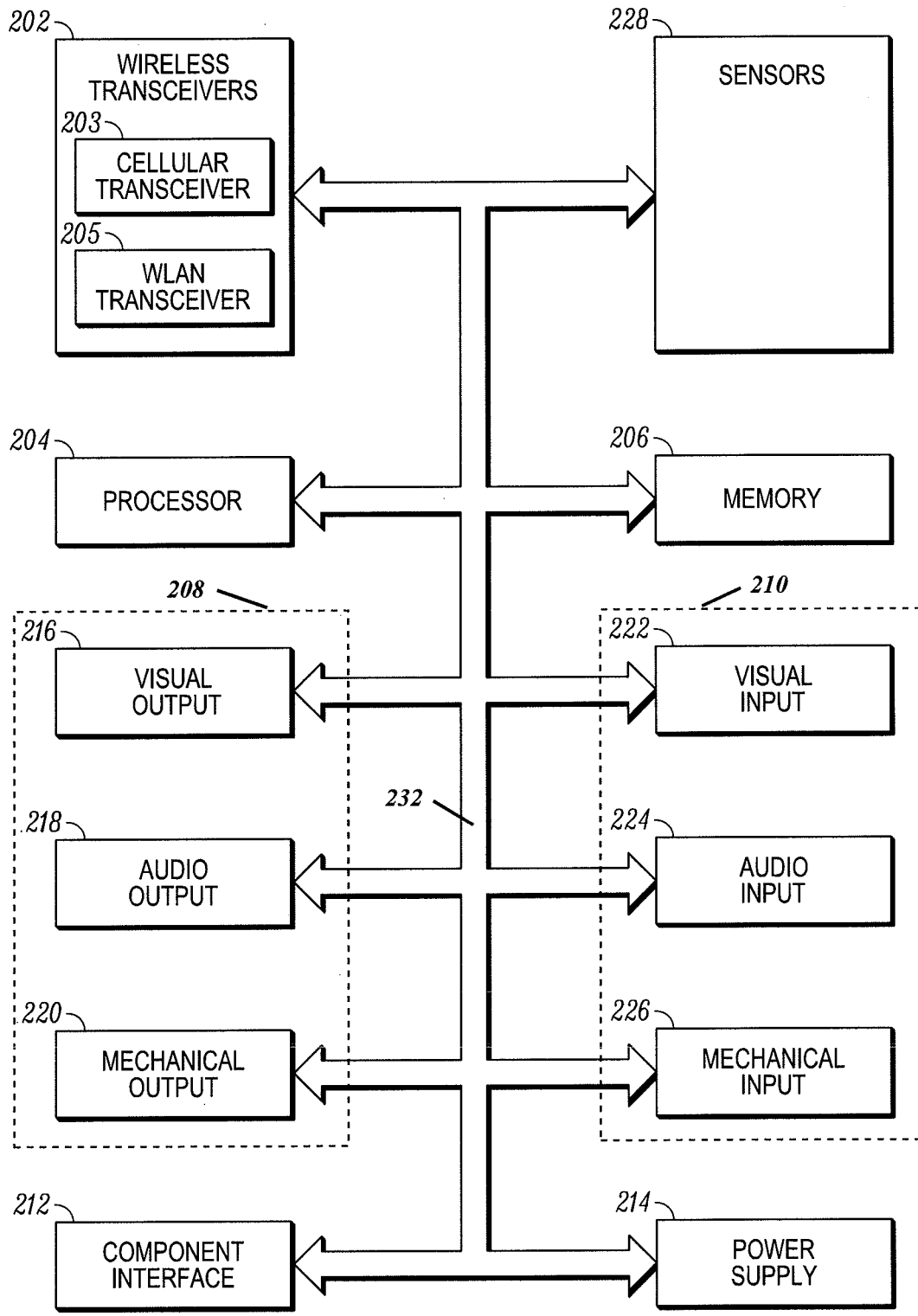
FIG. 2 is a block diagram showing example components of one of the mobile devices of FIG. 1.

Referring to FIG. 2, there is provided a block diagram illustrating example internal components 200 of a mobile device such as the mobile device 102 in accordance with the present embodiment. As shown in FIG. 2, the components 200 include one or more wireless transceivers 202, 203, 205 a processor 204 (e.g., a microprocessor, microcomputer, application-specific integrated circuit, etc.), a memory portion 206, one or more output devices 208, and one or more input devices 210. In at least some embodiments, a user interface is present that comprises one or more output devices 208, such as a display, and one or more input device 210, such as a keypad or touch sensor. The internal components 200 can further include a component interface 212 to provide a direct connection to auxiliary components or accessories for additional or enhanced functionality. The internal components 200 preferably also include a power supply 214, such as a battery, for providing power to the other internal components while enabling the mobile device to be portable. All of the internal components 200 can be coupled to one another, and in communication with one another, by way of one or more internal communication links 232 (e.g., an internal bus).

Each of the wireless transceivers 202 utilizes a wireless technology for communication, which can include for example (but are not limited to) cellular-based communication technologies such as analog communications (using AMPS), digital communications (using CDMA, TDMA, GSM, iDEN, GPRS, EDGE, etc.), and next generation communications (using UMTS, WCDMA, LTE, IEEE 802.16, etc.) or variants thereof, or peer-to-peer or ad hoc communication technologies such as HomeRF (radio frequency), Bluetooth and IEEE 802.11 (a, b, g or n), or other wireless communication technologies such as infrared technology. In the present embodiment, the wireless transceivers 202 include a cellular transceiver 203 and a wireless local area network (WLAN) transceiver 205, although in other embodiments only one of these types of wireless transceivers (and possibly neither of these types of wireless transceivers, and/or other types of wireless transceivers) is present. By virtue of the use of the wireless transceivers 202, the mobile device 102 is capable of communicating both with the CPW 106 by way of the communication link 110 and also with the web server 104 (and thus indirectly again with the CPW 106) by way of the communication link 105.

example operation of the wireless transceivers 202 in conjunction with others of the internal components 200 of the mobile device 102 can take a variety of forms and can include, for example, operation in which, upon reception of wireless signals, the internal components detect communication signals and the transceiver 202 demodulates the communication signals to recover incoming information, such as voice and/or data, transmitted by the wireless signals. After receiving the incoming information from the transceiver 202, the processor 204 formats the incoming information for the one or more output devices 208. Likewise, for transmission of wireless signals, the processor 204 formats outgoing information, which may or may not be activated by the input devices 210, and conveys the outgoing information to one or more of the wireless transceivers 202 for modulation to communication signals. The wireless transceiver(s) 202 convey the modulated signals by way of wireless and (possibly wired as well) communication links to other devices such as the web server 104 and one or more of the CPWs 106 (as well as possibly to other devices such as a cell tower, access point, or another server or any of a variety of remote device).

Depending upon the embodiment, the input and output devices 208, 210 of the internal components 200 can include a variety of visual, audio and/or mechanical outputs. For example, the output device(s) 208 can include one or more visual output devices 216 such as a liquid crystal display and light emitting diode indicator, one or more audio output devices 218 such as a speaker, alarm and/or buzzer, and/or one or more mechanical output devices 220 such as a vibrating mechanism. The visual output devices 216 among other things can include a video screen. Likewise, by example, the input device(s) 210 can include one or more visual input devices 222 such as an optical sensor (for example, a camera), one or more audio input devices 224 such as a microphone, and one or more mechanical input devices 226 such as a flip sensor, keyboard, keypad, selection button, navigation cluster, touch pad, touchscreen, capacitive sensor, motion sensor, and switch. Actions that can actuate one or more of the input devices 210 can include not only the physical pressing/actuation of buttons or other actuators, but can also include, for example, opening the mobile device, unlocking the device, moving the device to actuate a motion, moving the device to actuate a location positioning system, and operating the device.

As shown in FIG. 2, the internal components 200 of the mobile device 102 also can include one or more of various types of sensors 228. The sensors 228 can include, for example, proximity sensors (a light detecting sensor, an ultrasound transceiver or an infrared transceiver), touch sensors, altitude sensors, a location circuit that can include, for example, a Global Positioning System (GPS) receiver, a triangulation receiver, an accelerometer, a tilt sensor, a gyroscope, or any other information collecting device that can identify a current location or user-device interface (carry mode) of the mobile device 102.

The memory portion 206 of the internal components 200 can encompass one or more memory devices of any of a variety of forms (e.g., read-only memory, random access memory, static random access memory, dynamic random access memory, etc.), and can be used by the processor 204 to store and retrieve data. The data that is stored by the memory portion 206 can include, but need not be limited to, operating systems, applications, and informational data. Each operating system includes executable code that controls basic functions of the communication device, such as interaction among the various components included among the internal components 200, communication with external devices via the wireless transceivers 202 and/or the component interface 212, and storage and retrieval of applications and data, to and from the memory portion 206. Each application includes executable code that utilizes an operating system to provide more specific functionality for the communication devices, such as file system service and handling of protected and unprotected data stored in the memory portion 206. Informational data is non-executable code or information that can be referenced and/or manipulated by an operating system or application for performing functions of the communication device.

Figure 3:
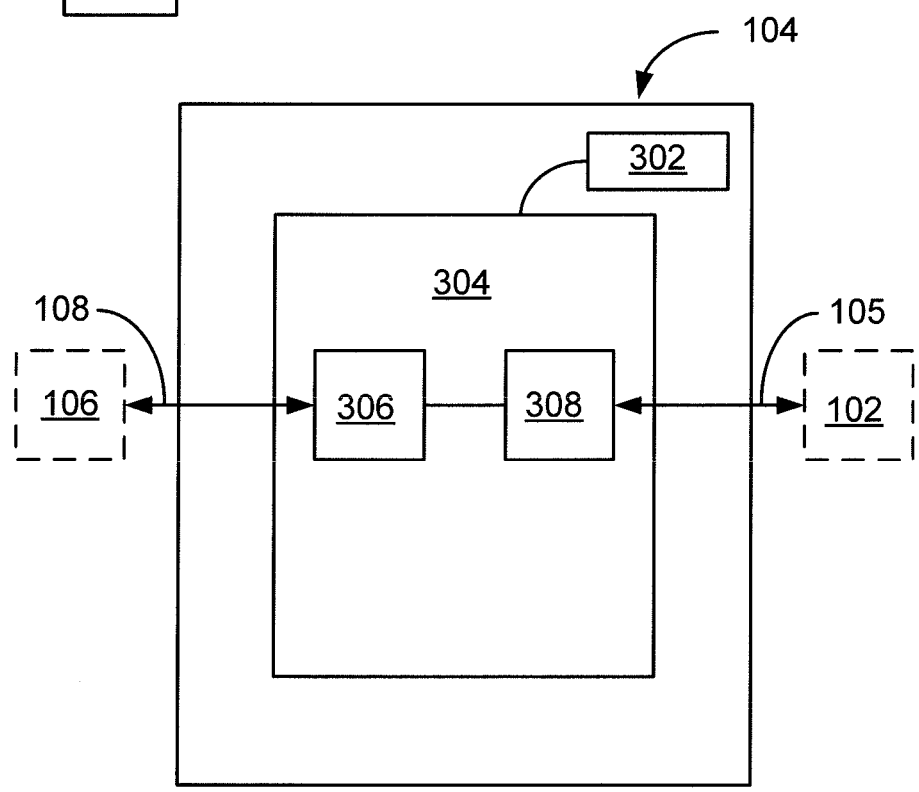
FIG. 3 is a block diagram showing example components of the intermediary web server of FIG. 1.

Referring next to FIG. 3, additional example components of the web server 104 of FIG. 1 are shown in more detail. As shown, the web server 104 includes a memory portion 302, a processor portion 304 in communication with that memory portion, and one or more input/output (I/O) interfaces (not shown) for interfacing the communication links 105, 108 with the processor 304. The processor portion 304 further includes a back end portion 306 (or Social Network Processor) and a front end portion 308. The back end portion 306 communicates with the CPWs 106 (shown in dashed lines) via the communication link 108 and the front end portion 308 communicates with the mobile device 102 (also shown in dashed lines) via the communication link 105.

As discussed in further detail below, in at least some embodiments the back end portion 306 supports pull communications with CPWs such as the CPW 106. The pull communications can for example be implemented using Representation State Transfer (REST) architecture, of the type typical to the web, and as such the back end portion is configured to generate requests for information to be provided to the back end portion 306 from the CPWs such as the CPW 106 at times/circumstances determined by the web server 104, in response to which the CPWs search for and provide back to the web server requested data. Also as discussed in further detail below, in at least some embodiments the front end portion 308 establishes a push channel in conjunction with mobile devices such as the mobile device 102.

In at least some such embodiments, the push channel allows the front end portion 308 to provide notifications from the web server 104 (generated by the front end portion) to the mobile device 102 at times/circumstances determined by the web server 104. The notifications can be indicative of information content that is available to be provided to the mobile device. The mobile device 102 in turn is able to respond to the notifications, in manner(s) deemed appropriate by the mobile device. Such responses often (but not necessarily always) constitute requests that some or all of the available information content be provided from the front end portion of the intermediary web server 104 to the mobile device.

Figure 4:
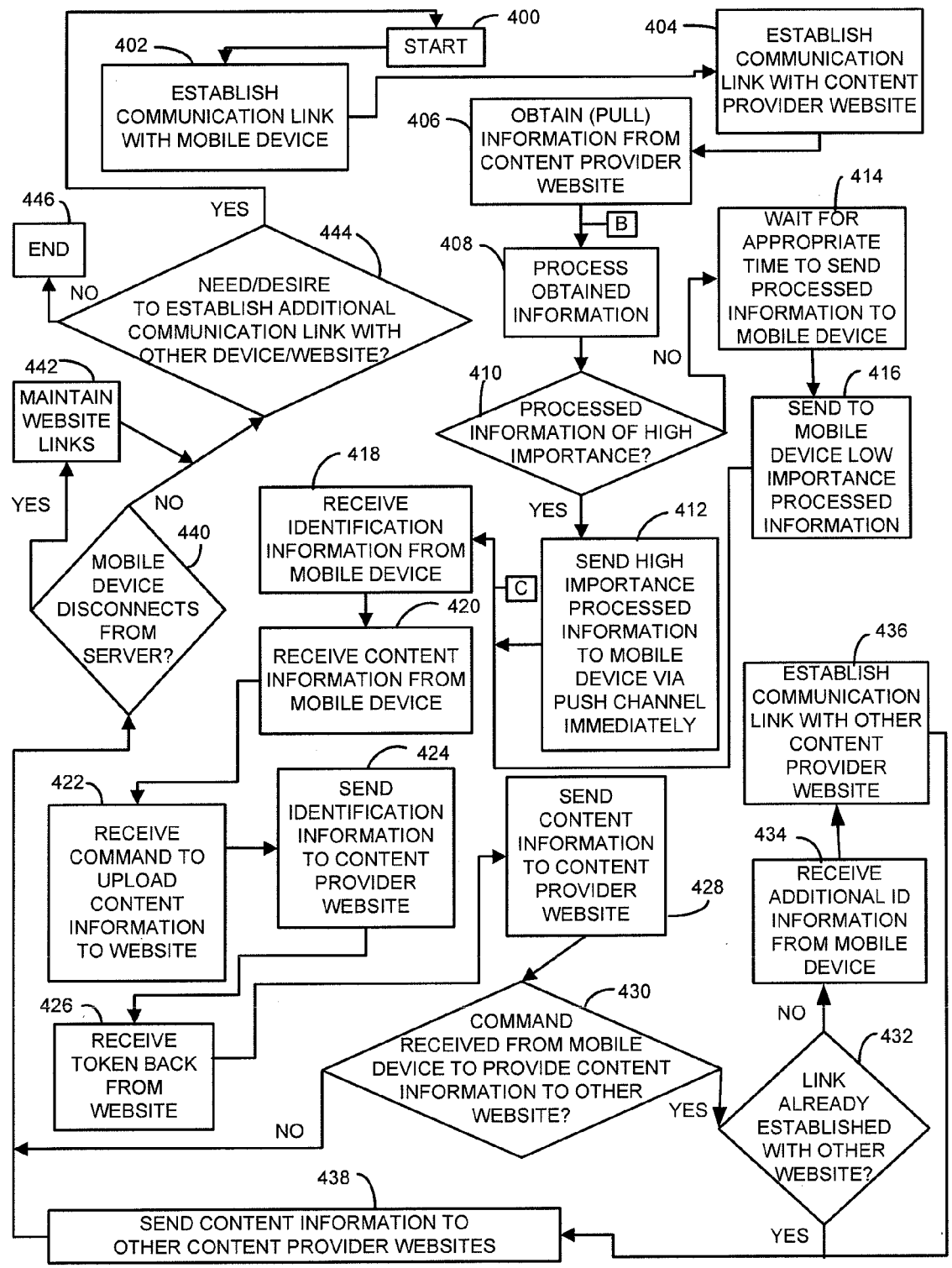
FIGS. 4-9 are flow charts showing various example steps of operation of the intermediary web server and mobile devices of FIG. 1.

Referring to FIG. 4, a flowchart is provided showing example steps of operation of the web server 104 of FIGS. 1 and 3, particularly when interacting with and intermediating communications between mobile devices and CPWs such as the mobile devices 102 and CPWs 106 shown in FIG. 1. Upon beginning the process represented by the flowchart of FIG. 4 at a start step 400, the web server 104 begins operation at a step 402 by establishing a communication link with a mobile device, such as the communication link 105 with the mobile device 102 of FIG. 1. As will be described in further detail below, the establishment of the communication link with the mobile device can, depending upon the embodiment, actually involve the establishment of multiple communication links (that can exist in parallel or at different times) with that mobile device.

In some such cases, the multiple communication links are of different types, for example, involving a push channel or communication protocols other than push channels. Also, while the establishment of a communication link with a mobile device 102 typically involves establishing a circuit switch connection with a base station, and thus the communication device providing identification information to the base station by which the mobile device identifies itself to the telecommunication network, the connection to the web server 104 can also be via an internet protocol (IP) connection or a point-to-point (P2P) telecommunications connection between the base station with which the mobile device is communicating and a load balancer/firewall, and also can involve the providing of a response signal from the web server back from to the mobile device by which the mobile device recognizes that it is in contact with the web server.

Upon completion of the step 402, at a step 404 the web server 104 further establishes a communication link with a CPW, such as the communication link 108 with the CPW 106 shown in FIG. 1. Establishment of the communication link at the step 404 can involve, for example, the providing of one or more web services calls and/or other techniques. Subsequent to the step 404, the web server 104 maintains ongoing communications, which can be (but need not be) periodic communications, with the CPW 106 and at one or more times obtains (pulls) information from the CPW. The information obtained from the CPW can include any of a variety of different types of information, including for example, information concerning contacts or friends (including a contacts list), new friends or updated contacts, special messages, news, happenings, and other types of information including possibly files (such as image files or text files) or other forms of data. Upon obtaining the information at the step 406, the web server then processes the obtained information at a step 408.

Figure 5:
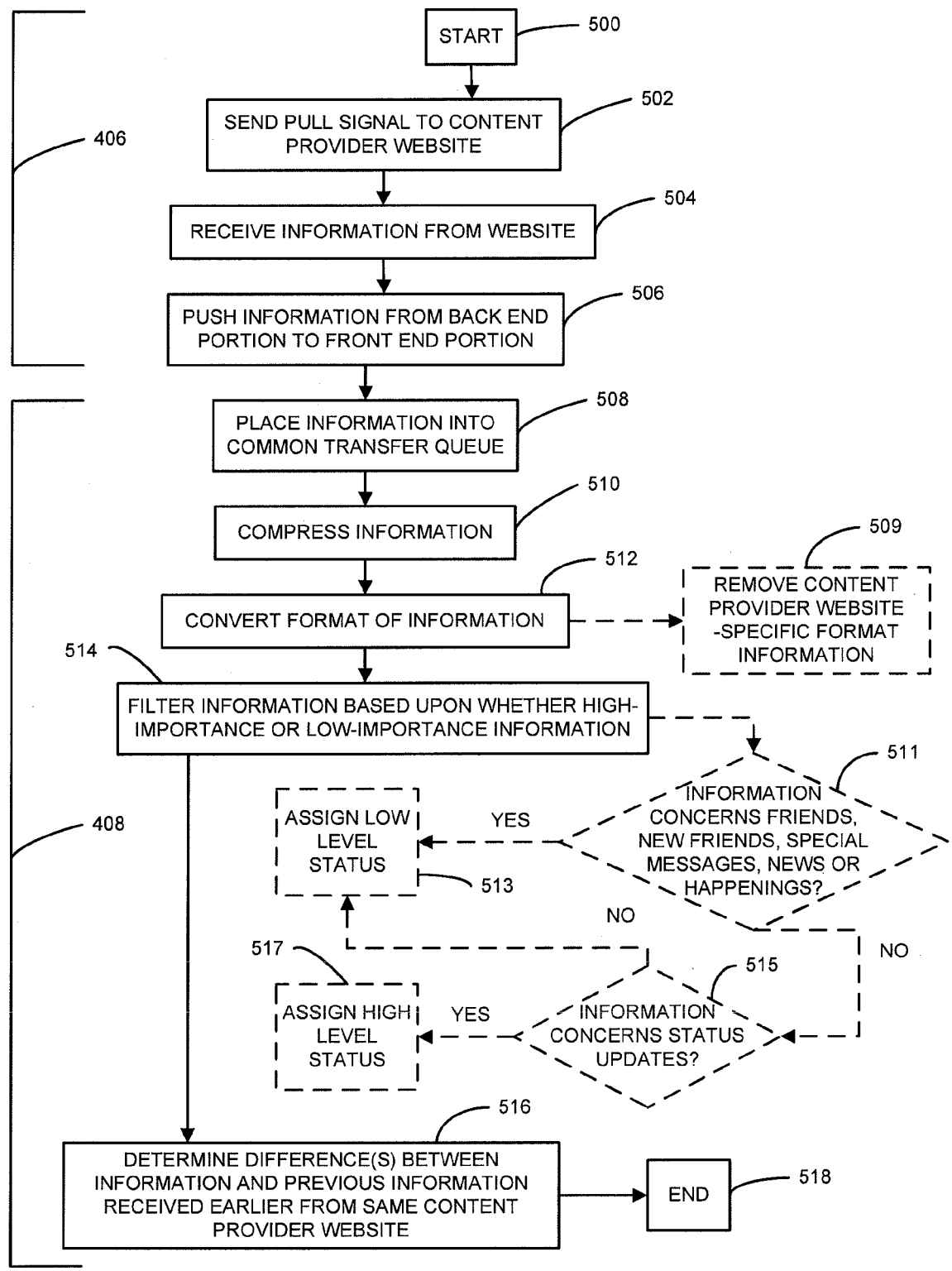

Referring additionally to FIG. 5, example substeps corresponding to the steps 406 and 408 of FIG. 4 are shown in accordance with one embodiment. As shown, the step 406 (the obtaining step) can be understood as encompassing several substeps beginning with a start substep 500 and further including three additional substeps 502, 504 and 506. More particularly, in the substep 502, the web server 104 sends a pull signal to the CPW 106, and at the substep 504, information is received back from the CPW at the back end portion 306 of the web server. After the information is received at the back end portion 306, at the step 506 this information is then pushed from the back end portion to the front end portion 308 of the web server 104.

Further as shown in FIG. 5, the step 408 (the processing step) can include in one embodiment several substeps beginning at a substep 508 prior to ending at a substep 518 (FIG. 5 shows the substeps corresponding to the step 408 as being a continuation of the substeps corresponding to the step 406). More particularly, at the substep 508, upon the front end portion 308 of the web server 104 receiving the information pushed from the back end 306 portion at the substep 506, that information is then placed into a common transfer queue. Next, at a substep 510 the information can optionally be compressed. Further, at a substep 512, the information can optionally be converted into a different format, for example, a binary format. As additionally represented by a block 509 (shown in dashed lines), the format conversion occurring at the substep 512 can include a removal of specific formatting information that was provided by the CPW 106, so as to standardize the formatting of the information and remove site-specific format information, though not the source identity, or otherwise to modify the formatting of the information to be of a uniform, or universal, format provided to the mobile device regardless of the CPW formatting that was the source of the information.

Next, at a substep 514, the information is filtered based upon whether it is high importance or low importance information. As further represented by substeps 511, 513, 515 and 517 (shown in dashed lines), this filtering operation can involve further determinations. Namely, as shown at a substep 511, the web server 104 can determine whether the information concerns friends, new friends, special messages, news or happenings. If so, then at a substep 513 that information is assigned a low level status. However, if the information does not fall into one of those groupings, then the filtering process proceeds to the substep 515, at which the web server determines whether the information concerns status updates. If it does, then a high level status is assigned to the information at the substep 517. In the present example embodiment, if the information is determined not to concern status updates at the substep 515, then the process again returns to the substep 513. It will be recognized that the web server 104 can determine whether the information is a status update for the user, and if it is, treat the information as high level, or high priority, and if it is not, treat the information as low level, or low priority. Other types of information may be also be treated as high priority, though it is desirable to restrict the number of messages that result in increased activity for the communication device.

Upon completion of the filtering substep 514, the process then advances to a substep 516, in which the web server 104 (specifically the front end portion 308 of the web server) determines one or more differences that may exist between the information that was obtained at the step 406 from the CPW 106 and previous information that was received earlier from the same CPW. In the present embodiment, it is only such difference information that is ultimately transmitted back to the mobile device 102. As already noted, the substeps represented by FIG. 5 corresponding to the step 408 of FIG. 4 end at the substep 518. It will be recognized that step 516 can advantageously occur in the back end portion 306 between steps 504 and 506, in which case the information will only be further processed in the web server 104 if there is a change in CPW information from the previous time content was pulled for the particular subscriber. This will free up server resources to continue to pull information from the CPW for the user of device 102 or other users who use the intermediary web server and the CPW.

Returning to FIG. 4, upon the completion of the step 408, the web server 104 considers whether one or more portions of the processed information are of high importance or not of high importance (e.g., of low importance, or possibly of medium importance or some other importance level). If it is determined that the processed information is of high importance, then at a step 412 the front end portion 308 of the web server 104 sends the high importance processed information to the mobile device 102 via the push channel established across the communication link 105. This occurs immediately, at the time determined by the web server, as made possible by way of using the push channel. If at the step 410 it is determined that the processed information is not of high importance, then the sending of the processed information can be delayed until another more appropriate time to thereby reduce the communication activity between the device and server, and thus reduce the battery drain on the device. Thus, at a step 414, the web server 104 waits for an appropriate time to send the processed information to the mobile device 102. Then, once an appropriate time has occurred, at a step 416 the information is then sent to the mobile device 102 by the web server 104.

The appropriate time at which low importance processed information is sent by the web server 104 to the mobile device 102 can be based upon various considerations. For example, in some embodiments, such appropriate times are merely periodically-occurring times at which the mobile device 102 polls the web server 104 for information. Such polling typically involves the repeated sending of inquiry signals from the mobile device 102 to the web server 104. In other cases, an appropriate time occurs when the particular circumstances have arisen. For example, an appropriate time for sending low importance processed information can occur when the mobile device 102 makes a request if additionally it is the case that by that same time the web server 104 has determined that a certain quantity of low importance processed information has been stored for transmission to the mobile device. Although in the above description the obtaining of information by the web server 104 is described as involving pulling while the obtaining by the mobile device of low importance information from the web server is described as involving polling, it should be understood that either pulling or polling operations (and either periodic or asynchronous communications) can be used by either of the web server and the mobile device, respectively, to obtain information from the CPW and the web server, respectively, depending upon the embodiment. Additionally, it is envisioned that the server 104 can be pulling information from the CPW 106 when the mobile device 102 is not connected to the server, as a consequence of which the server will hold information until the mobile device reconnects, or when enough time elapses that the server deletes the information.

Regardless of whether high importance or low importance information is sent to the mobile device 102 at steps 412 and 416, respectively, upon completion of these steps, a series of additional steps are performed by the web server 104 in interacting with the mobile device, the CPW, or additional mobile devices/CPWs. More particularly in this regard, upon the completion of steps 412 and 416, at steps 418-428, information from the mobile device 102 can be uploaded to the web server 104 and further provided to the CPW 106. As shown in FIG. 4, at the step 418, such interaction can begin by the web server 104 receiving identification information from the mobile device 102. Receipt of such identification information need not always occur, for example, if such identification information was already received at the step 402. Then, at a step 420, the web server 104 additionally receives content information from the mobile device 102. Content information can include, for example, files such as image files or text files or other data that the user of the mobile device wishes to have uploaded to a user profile (e.g., a "wall") existing at the CPW.

Next, at a step 422, the web server 104 receives a command from the mobile device 102 instructing the web server to upload the content information to the CPW 106. In alternate embodiments, this command need not be expressly provided by the mobile device 102 to the web server 104 since, in such embodiments, it is presumed by the web server that all content information provided by the mobile device should be further uploaded to any CPW with respect to which that mobile device is associated. Further then at a step 424, the web server 104 sends the identification information received from the mobile device 102 to the CPW 106 so as to authenticate the relationship between the web server and the CPW. In response to sending this identification information, typically a token is received back from the CPW if the authentication is satisfactory, as indicated by a step 426. As with respect to the step 418, the steps 424 and 426 need not be expressly performed at this time in all embodiments, particularly where such actions were taken as part of the establishment of the communication links in the step 402, 404. Regardless of when the authentication occurs, the authentication process allows the web server 104 to interact with the CPW 106 on behalf of, and as a proxy of, the mobile device 102. Assuming that proper authentication has occurred, then at the step 428 the content information is sent by the web server 104 to the CPW 106.

It is envisioned that the user ID and password required for the web server 104 to upload and download content to and from the CPW 106 for a particular user account on the CPW can be loaded into the web server 104 by the user when the mobile device 102 first connects to the server and sets up the CPW on the web server. The web server will store the user ID and password in the memory, and access the CPW using the user ID and password as long as the user does not change them, to maintain a persistent connection with the CPW regardless of whether the mobile device 102 is connected. It is further envisioned that the pulling of information by the web server 104 from the CPWs 106 can be reduced in frequency, or completely paused (or terminated), if the mobile device does not request information from the server for a predetermined time period, or if the web server queue containing content to be further downloaded to the device exceeds an age threshold and/or a storage capacity threshold.

In addition to the previously-described uploading process, in some circumstances a user operating the mobile device 102 will desire that the contents be uploaded to more than one of the CPWs 106. Such a process can be facilitated by the web server 104, as indicated by steps 430-438 of FIG. 4, particularly where the content information has already been provided to the web server by the mobile device 102. More particularly as shown, at the step 430 it is determined by the web server 104 whether a further command has been received by the web server from the mobile device 102 instructing the web server to provide the content information to another CPW. If such a command has been received, then at a next step 432 the web server 104 determines whether a communication link has already been established with the other CPW. If such a communication link has not already been established, then the process advances to a step 434, in which additional identification information is received from the mobile device 102 and subsequently at a step 436 that communication link is established between the web server 104 and the other CPW 106. That is, if a communication link has not already been established with the other CPW as determined at the step 432, then in order to establish such a communication link the web server 104 again must be provided with identification information from the mobile device 102 allowing that web server to be authenticated in relation to that other CPW so as to operate as a proxy for the mobile device in relation to that other CPW (e.g., substantially the same operations as described above in relation to the steps 424-426).

Upon the establishment of the communication link at the step 436, or if it is determined at the step 432 that a communication link was already established with the other CPW, then the process advances to the step 438, at which the content information is uploaded to the other CPW. Thus, by virtue of the steps 430-438 the content information already provided to a first CPW at the step 428 is additionally provided to another CPW. It will be understood that, although FIG. 4 does not show immediate looping in the repeat performing of the steps 418-438, the steps can be repeated numerous times in relation to numerous portions of information and more than one additional CPW. It is envisioned that the content will be provided from the mobile device 102 in a uniform format, and that the server back end portion will format the data separately and appropriately for each of the target CPWs to which the content is being uploaded.

Further with respect to FIG. 4, upon the completion of the step 438, or in the event it is determined by the web server 104 at the step 430 that no command was received, then the web server additionally proceeds to determine whether the mobile device 102 has disconnected from the web server, at a step 440. Even though the mobile device 102 has disconnected from the web server 104, as a general rule the web server will still maintain its communication links with the CPWs 106 to which it has previously entered into communications and in relation to which the web server is capable of acting as a proxy on behalf of the mobile device that has been disconnected, as represented by a step 442. Thus, the web server 104 can continue to operate in relation to the CPWs 106 on an ongoing basis even though the mobile device 102 on whose behalf the web server is acting is temporarily out of communications. Consequently, the web server 104 can continue to operate to pull information from the various CPWs 106 and can access and monitor such information over time, such that when a previously-disconnected mobile device is reconnected to the web server, the web server is able to immediately (if appropriate) provide the most recent, updated CPW information available.

Notwithstanding the above description, and although not shown in FIG. 4, in certain embodiments it is also possible for the mobile device 102 to communicate an instruction to the web server 104 that the web server cease acting on its behalf in relation to one or more of the CPWs 106, in which case the web server will do so. Finally, as also shown in FIG. 4, both when the step 442 has been completed or in the event that at the step 440 it is determined that the mobile device 102 is still connected, the web server 104 proceeds to determine if there is a need or desire to establish additional communication links with other ones of the mobile devices 102 and/or CPWs 106. In accordance with the present flow chart, if there is no such need or desire, the process ends at a step 446 while, if there is such a need or desire, then the process returns to the start step 400.

It should be understood that, notwithstanding the particular steps as shown in FIG. 4, a variety of additional or different steps can be performed by the web server 104 depending upon the embodiment, and one or more of the particular steps shown in FIG. 4 can be rearranged, repeated or eliminated entirely depending upon the embodiment. Also, some of the steps performed according to the flow chart of FIG. 4 can be repeated on an ongoing or continuous basis simultaneously while others of the steps are performed. For example, the steps 406-412 relating to the obtaining and processing of information received from the CPWs 106 and the immediate (or substantially immediate) sending of high importance information to the mobile device 102 can be repeated on an ongoing or continuous basis even while other interactions such as those represented by the steps 418-438 relating to the uploading of content information from the mobile device to the web server and then to one or more of the CPWs is also being conducted. Further, while FIG. 4 describes in some detail the possibility of the web server 104 being in communication with multiple CPWs 106 in succession or simultaneously, and illustrates example interactions facilitated by the web server between a given mobile device and such one or more CPWs, it should be understood that the same process can be performed at the same or substantially the same time by the web server in terms of allowing similar interactions to occur between any number of other mobile devices and such one or more CPWs.

It is envisioned that the back end portion 306 can include a separate plug-in for each CPW 106, including respective APIs appropriate for its respective CPW. Each of the plug-ins includes APIs for its respective CPW by which the plug-in pulls information from the web site and reformats the information into the universal format of the mobile device 102 client. Additionally, content from the mobile device will be reformatted from the uniform format of the mobile device 102 client program to the appropriate format specified by the CPW associated with that plug-in when uploaded by the back end portion 306. In this way, content from the mobile device 102 can be sent in a single message having a uniform format and it will be routed as selected by the user and formatted by each of the back end portion plug-ins for each of the respective CPWs to which it is targeted.

Figure 6:
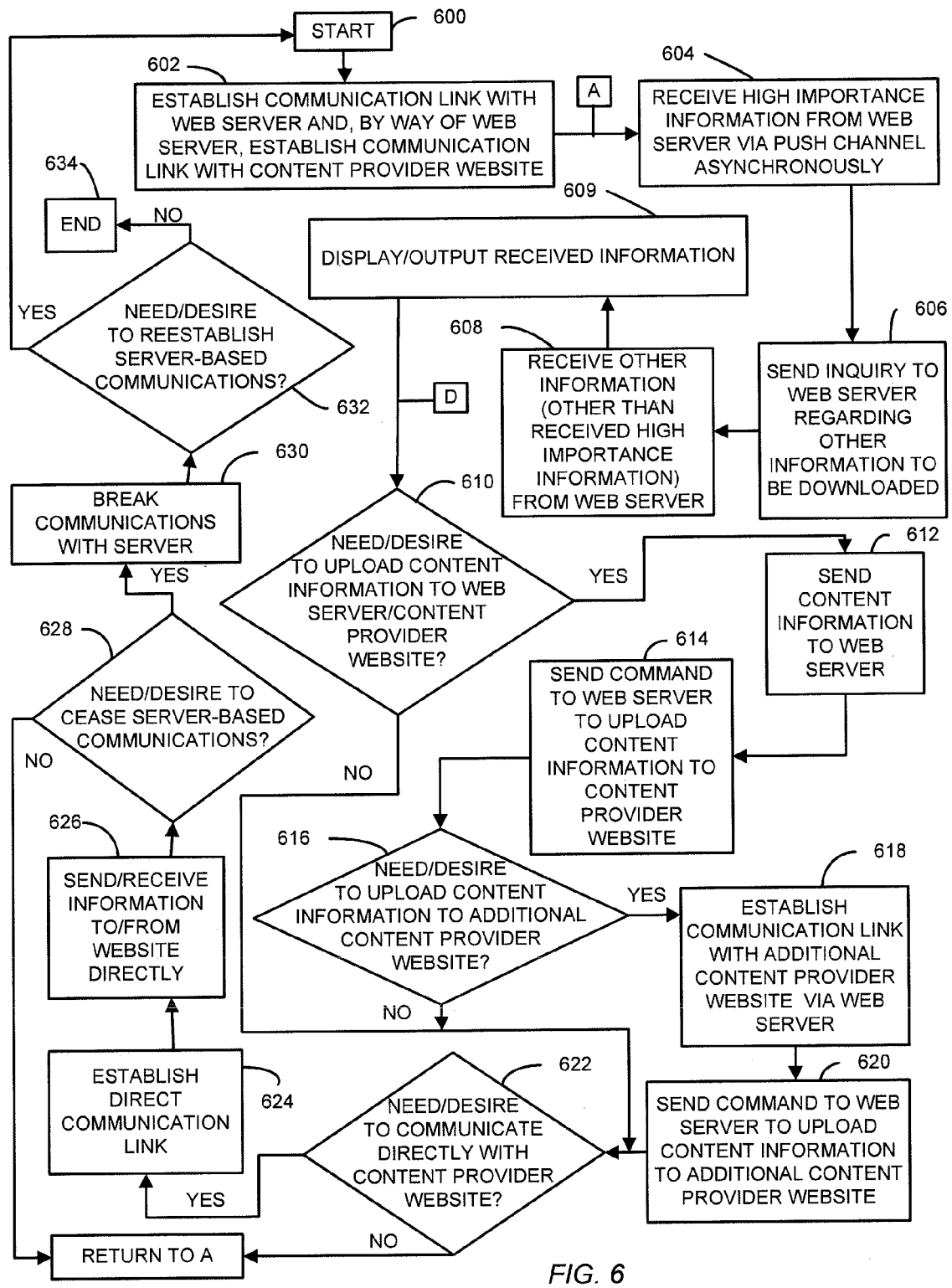

Turning to FIG. 6, an additional flow chart is provided showing example steps of operation of the mobile device 102 as it interacts with the web server and, by virtue of this interaction, is able to interact with one or more CPWs. That is, FIG. 6 is intended to illustrate example steps of operation of the mobile device 102 that are complementary with (or largely complementary with) respect to a number of the steps performed by the web server 104 as illustrated in FIGS. 4 and 5 above. Additionally, as will be described further below, FIG. 6 also includes steps by which the mobile device 102 is capable of interacting directly with one or more of the CPWs 106 without intermediation by the web server 104, or simultaneously along with (but independent of) intermediation by the web server. As shown in FIG. 6, upon commencing operation at a start step 600, the mobile device 102 begins its interaction with the web server 104 by establishing a communication link with the web server and, by way of the web server thus establishing a communication link with the CPW, at a step 602.

Figure 7:
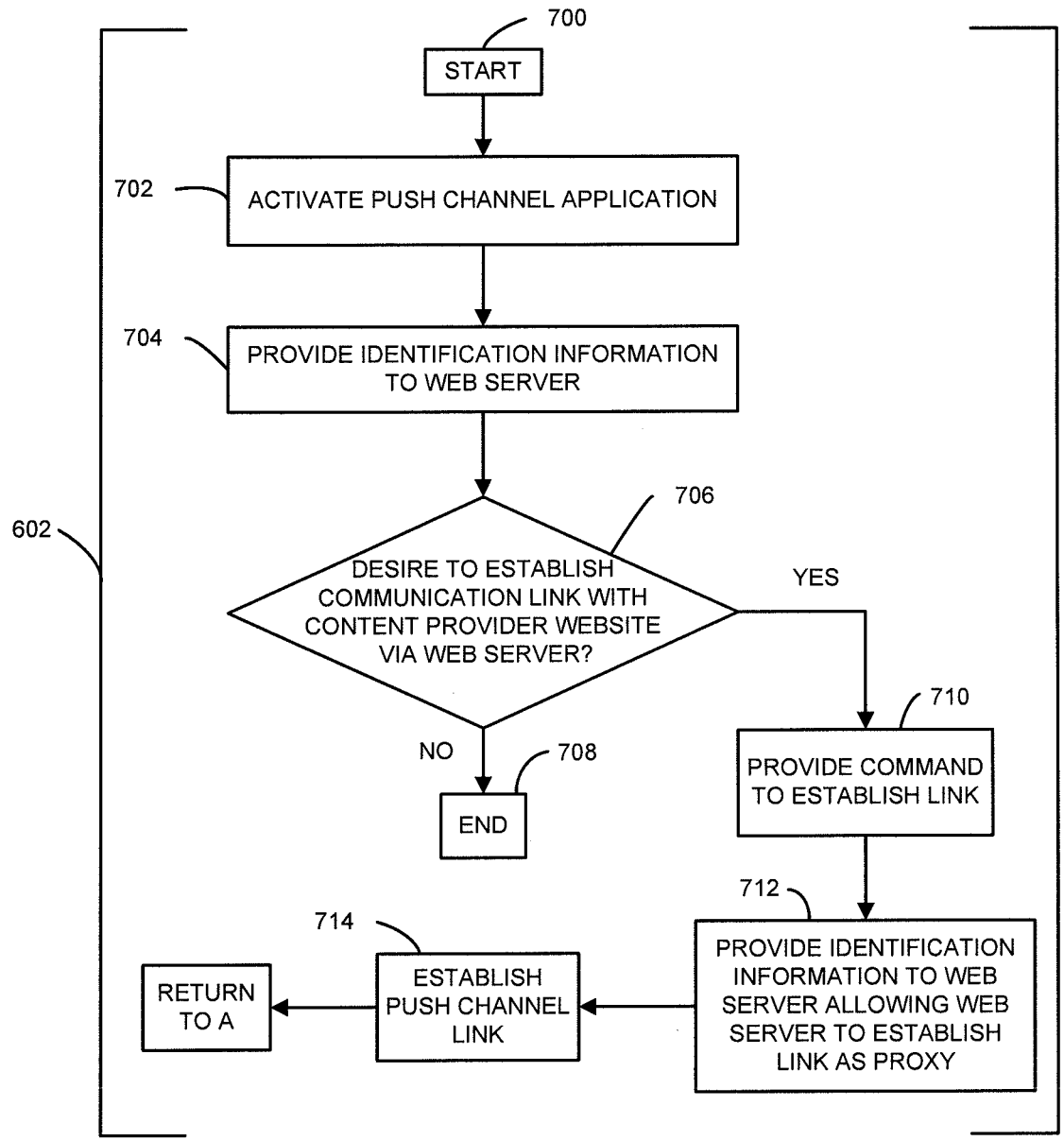

Referring additionally to FIG. 7, the step 602 can be understood as encompassing several substeps as illustrated in that Figure. As shown, upon starting at a substep 700, the mobile device 102 activates a push channel application supported on the mobile device, as indicated at a substep 702. Then, at a substep 704 the mobile device 102 provides identification information to the web server 104. Such identification information can include, for example, identification codes specifying the particular mobile device (e.g., a serial number, model number or product reference number), information relating to the identity of a user utilizing the mobile device, or other coding information such as login or password codes. Next at a substep 706, it is determined at the mobile device 102 whether there is a desire to establish a communication link with a particular one of the CPWs 106 via the web server. If there is no such desire at this time, then the process represented by FIG. 7 ends at a substep 708. Alternatively, if there is a desire to establish a communication link with the CPW 106 via the web server 104, as can be indicated by a user providing a command to the mobile device 102 indicating such a desire, then at a substep 710 the mobile device 102 additionally sends a command to the web server instructing the web server to establish such a communication link.

Further, at a substep 712, the mobile device 102 additionally sends to the web server 104 additional web identification information allowing the web server to establish the communication link with the CPW 106, and to act as a proxy for the mobile device in its communications with that CPW. The identification information sent at the substep 712 in some embodiments can be the same as that of the substep 704, in which case the substep 712 need not be performed. Once the identification information has been provided at the substep 712, a push channel link is established between the mobile device and the web server at a substep 714. Upon completion of the substep 714, the remaining steps of the process represented by FIG. 6 subsequent to the step 602 can be performed (as indicated by the block "Return to A").

Returning to FIG. 6, upon establishment of the communication link with the web server 104 at the step 602, at a step 604 the mobile device 102 receives high importance information from the web server via the push channel (e.g., the push channel established at the substep 714). This information, as already described with reference to FIGS. 4-5, in the present embodiment is provided from the web server 104 to the mobile device 102 in an asynchronous manner, that is, at times not determined by the mobile device. In addition to receiving such high importance information on an asynchronous basis, as further represented by a subsequent step 606, the mobile device 102 can additionally send one or more inquiries to the web server 104 regarding other information to be downloaded by the web server to the mobile device. As discussed above with reference to FIG. 5, while high importance information can include information such as status update information, other information (e.g., low importance information) can include information such as contact/friend information, new friend information, contact lists, photos or videos, special messages, news or happenings information.

The inquiries provided by the mobile device 102 at the step 606 can be provided on a periodic basis or at other times as determined by the mobile device. Although in the present embodiment it is envisioned that the mobile device 102 will determine when inquiries to the web server 104 are made that in turn determine whether information other than high importance information is communicated from the web server to the mobile device, in other embodiments such inquiries and/or downloading of information can occur at times determined by mutual agreement between the web server and the mobile device, at times determined solely by the web server alone (e.g., when the web server has determined that a sufficient amount of low importance information has been collected), or at times determined by another entity or party such as a manufacturer who has programmed both devices. Regardless of whether it is inquiries from the mobile device 102 that prompt the sending of information by the web server 104 back to the mobile device or whether it is other triggers that prompt the sending of such information, as indicated at a step 608 eventually such other information is also received by the mobile device from the web server. While the step 602 can be considered complementary to the step 402 of FIG. 4, the steps 604-608 can be considered complementary to the web server operations represented by steps 406-412 (and particularly steps 414-412) of FIG. 4.

Referring still to FIG. 6, at a subsequent step 609 the information received by the mobile device 102 from the web server 104 is displayed or otherwise output by the mobile device. The extent to which such displaying/outputting of information occurs will depend upon the embodiment. In at least some embodiments, the information is displayed/output by the mobile device 102 in a standardized manner such that CPW-specific formatting information or features are not provided as part of the displayed/output information. More particularly in some such embodiments, CPW-specific formatting information and features are redacted by the web server 104 or, in some alternate embodiments, by the mobile device or the combination of both the web server and the mobile device.

In performing such redactions, similar types of information found at different CPWs, even if referred to in different manners by the different CPWs (e.g., as information found at a posting site or instead as information found on a wall), are recognized as being of similar type conceptually and, based upon such recognition, such information can be displayed (or output) in a common manner on the mobile device regardless of the origin of the information. That is, given the redaction of such CPW-specific formatting information or features, information of the same conceptual type from different CPWs, even if formatted differently at the different CPWs, is nevertheless displayed a same or similar, consistent manner on the mobile device regardless of the origin of that information, thus facilitating a user's review of such information. It should further be noted that such information can include not only text and image data but also a wide variety of other data, including data allowing for the display of interactive windows and data entry fields on the mobile device, into which the user as able to enter additional information or commands that can then be sent back to the web server.

Next, at a step 610 the mobile device 102 determines whether there is a need or desire to upload content information currently available at the mobile device to the web server and/or ultimately to the CPW 106. The need or desire can be determined automatically by the mobile device 102, for example, based upon whether a particular type of information has been received by the mobile device from a user or other source or whether a particular event has occurred or time has passed triggering such an uploading event. Often, such a need/desire will occur in response to a user command provided to the mobile device 102. If at the step 610 it is determined there is no such need/desire, then as shown the process advances to a step 622 discussed below. However, if it is determined at the step 610 that there is such a need/desire, then at a step 612 the mobile device 102 sends the content information to the web server 104 and at a step 614 the mobile device additionally sends a command to the web server to upload the content information to the CPW 106. The steps 610-614 can be understood as being generally complementary to the steps 418-428 of FIG. 4 except insofar as the identification information that is provided from the mobile device 102 for authentication purposes as discussed with reference to step 418 can be understood as having already been provided at the step 602 shown in FIG. 6 (alternatively, additional identification information suitable for this purpose can be provided just prior to the step 612).

Upon completion of the step 614, the mobile device 102 further determines whether there is a need/desire to upload the content information to one or more additional CPWs in addition to the first CPW to which that information was already uploaded, at a step 616. Again, that need or desire can be determined based upon a variety of factors including, among other things, one or more instructions provided by a user of the mobile device to the mobile device. If at the step 616 it is determined that there is no such need or desire, then the process advances again to the step 622 discussed below. However, if it is determined at the step 616 that there is such a need or desire, then the process advances to a step 618, in which an additional communication link is established between the mobile device and such additional CPW via the web server. The step 618 can be considered complementary to the steps 432-436 of FIG. 4 and can, depending upon the embodiment include substeps where the mobile device first determines whether a communication link already exists with such additional CPW and, if it is determined that no such communication link already exists, then sends additional identification information to the web server to establish such a communication link with such additional CPW and to allow the web server to act as a proxy for the mobile device in such communications.

Upon the establishment of the additional communication link with the additional CPW 106 at the step 618, then the mobile device 102 further sends a command to the web server 104 to upload content information to that additional CPW 106 at a step 620. Performance of the step 620 can be understood as corresponding to the step 430 of FIG. 4, it being further understood that the order of performance of steps 618 and 620 is reversible so that those steps more closely correspond to the order of steps 430-436 of FIG. 4. Additionally with respect to FIG. 6, upon the completion of the step 620, it is presumed that the web server 104 in fact uploads the content information to the additional CPW. Although not shown, in some embodiments, upon completion of such uploading, the web server 104 sends an indication signal back to the mobile device 102 confirming that such uploading has occurred.

Although the above-described steps of FIG. 6 as well as the steps of FIG. 4 envision the use of the web server 104 as an intermediary between the mobile device 102 and the CPWs 106, the web server need not always intermediate such communications but rather in some circumstances the mobile device interacts directly (that is, directly by way of one or more networks that do not involve any web server, or at least not a web server as described above) with respect to one or more of the CPWs. In that regard, the mobile device 102, upon completing the step 620 (or, in some cases, the steps 610 and 616 as discussed above) further determines whether there is a need or desire for the mobile device to communicate directly with one or more of the CPWs 106 at the step 622.

If the mobile device 102 determines at the step 622 that this is not the case, then the mobile device can return in its operation to a node A, in response to which the process begins again at the step 604 and proceeds onward. Assuming this to occur, the mobile device 102 thus continues to both receive information from the web server 104 and also continues to operate to upload content information to the web server on a repeated, ongoing basis. If however at the step 622 the mobile device 102 determines that there is a need or desire to communicate directly with the CPW 106, then the mobile device proceeds to a step 624 at which the mobile device establishes such a direct communication link.

Whether there is a need or desire to communication directly with the CPW 106 can be determined based on a variety of considerations. In some circumstances, the mobile device 102 determines this automatically and as a result automatically proceeds to establish the direct communication link with the CPW 106. For example, if a user requests more information regarding a particular topic and downloading of that information from a given CPW is best accomplished (e.g., in terms of efficiency of data transfer or the like) by way of direct communications with the CPW, then the mobile device can attempt to connect directly to the CPW. Also it is possible in some circumstances that a user may wish to view information available at a particular CPW in the particular format associated with that CPW, and not wish to view a redacted view of such information as might be provided if the information was processed by the web server 104 en route to the mobile device. Also the determination of whether there is a need or desire to communicate directly with the CPW 106 can be determined based upon receipt of a user command that expressly requests such communications.

The establishment of a direct communication link at the step 624 can involve a variety of particular commands or operations by the mobile device, which in some circumstances can involve receiving inputs from a user, depending upon the embodiment. For example, in one circumstance, a user initiates the establishment of such a direct communication link by causing a browser application/program to be opened and run on the mobile device and by entering a URL (Universal Resource Locator) for the CPW into an input field provided by the browser, as a result of which the browser enters into communication with the CPW and the CPW in turn returns web pages or other information back to the browser by which the mobile device (and user) is able to engage in further communications with the CPW. In other embodiments, the establishment of the direct communication link is an automatic process that does not involve any specific user actions.

Regardless of how the direct communication link is established, upon establishment of that link then at a further step 626 the mobile device 102 sends and/or receives information to and/or from the CPW 106 directly (again, without the intermediation of the web server described above). Subsequently, at a step 628, the mobile device further determines whether there is a need or desire to cease the existing communication link with the web server 104. If there is no such need/desire, then the process returns to the node A and again the step 604 and subsequent steps are repeated. That is, both direct communications (without web server intermediation) and indirect communications (by way of the web server) between the mobile device and the CPW(s) can continue simultaneously. However, if at the step 628 it is determined that there is a need or desire to cease server-based communications, then the process advances to a step 630 at which the mobile devices communication with the web server is broken (which corresponds to the step 440 discussed above with respect to FIG. 4).

In the present embodiment, as discussed above, the web server 104 is configured to maintain itself in communications with the CPW or sites with which it was previously in communication on behalf of the mobile device even after the communications with the mobile device have been terminated, with the web server continuing to act as a proxy for the mobile device. However, in other embodiments, the web server's communications with the CPWs are severed when the mobile device terminates its communications with the web server. In any event, subsequent to the step 630, at a step 632 there may be a new need or desire on the part of the mobile device to reestablish communications with the web server. As with the determinations of whether to enter into direct communications with the CPW 106 at the step 622 or cease communications with the web server 104 at the step 628, whether there is a need or desire on the part of the mobile device 102 to reestablish communications with the web server 104 at the step 632 can be determined based upon any of a variety of considerations including, for example, user commands that trigger such activities, battery power considerations, etc. If at the step 632 it is determined that server-based communications should be reestablished, then the process returns to the start step 600. If not, the process represented by FIG. 6 is ended at an end step 634.

Figure 8:
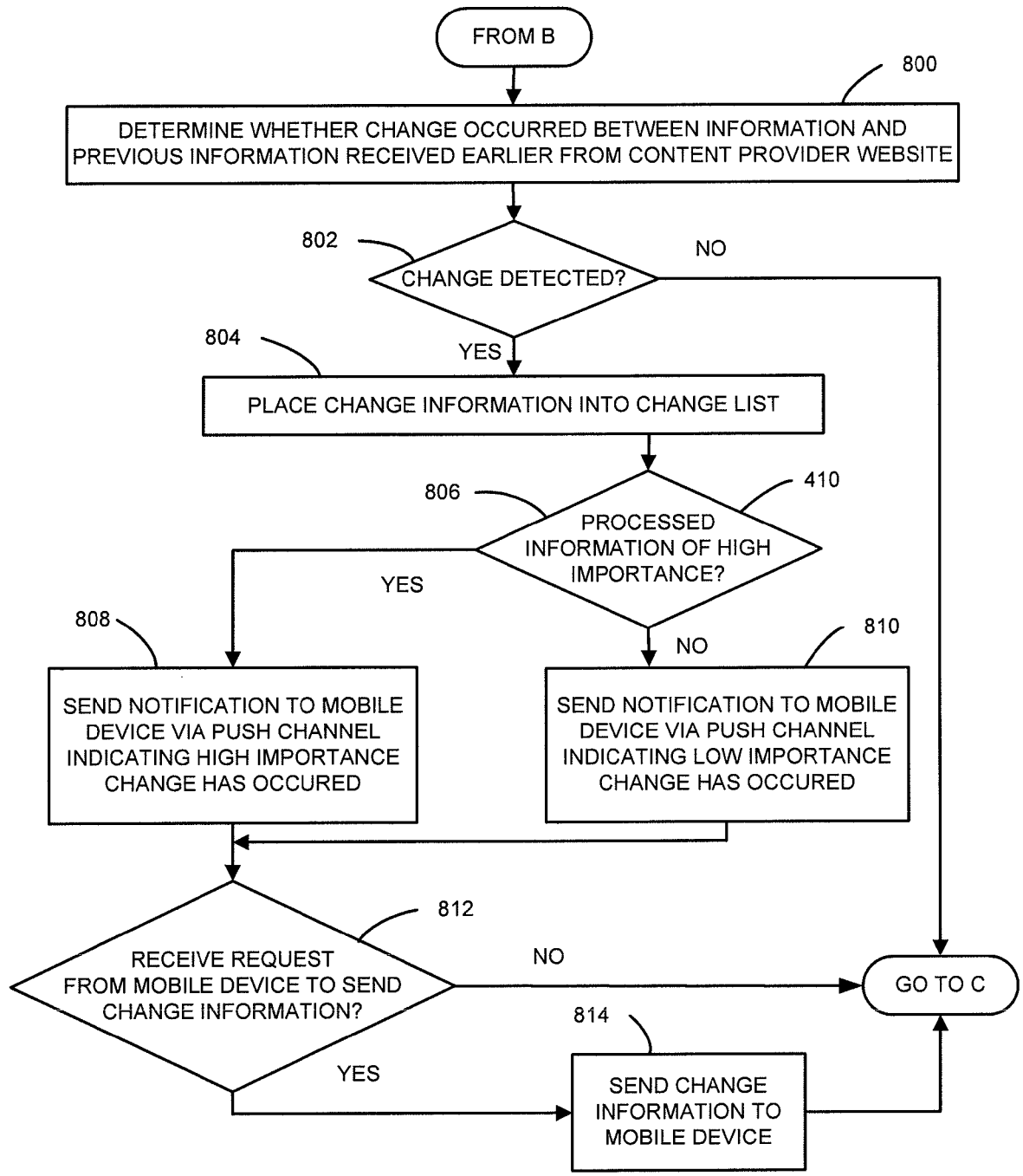
Figure 9:
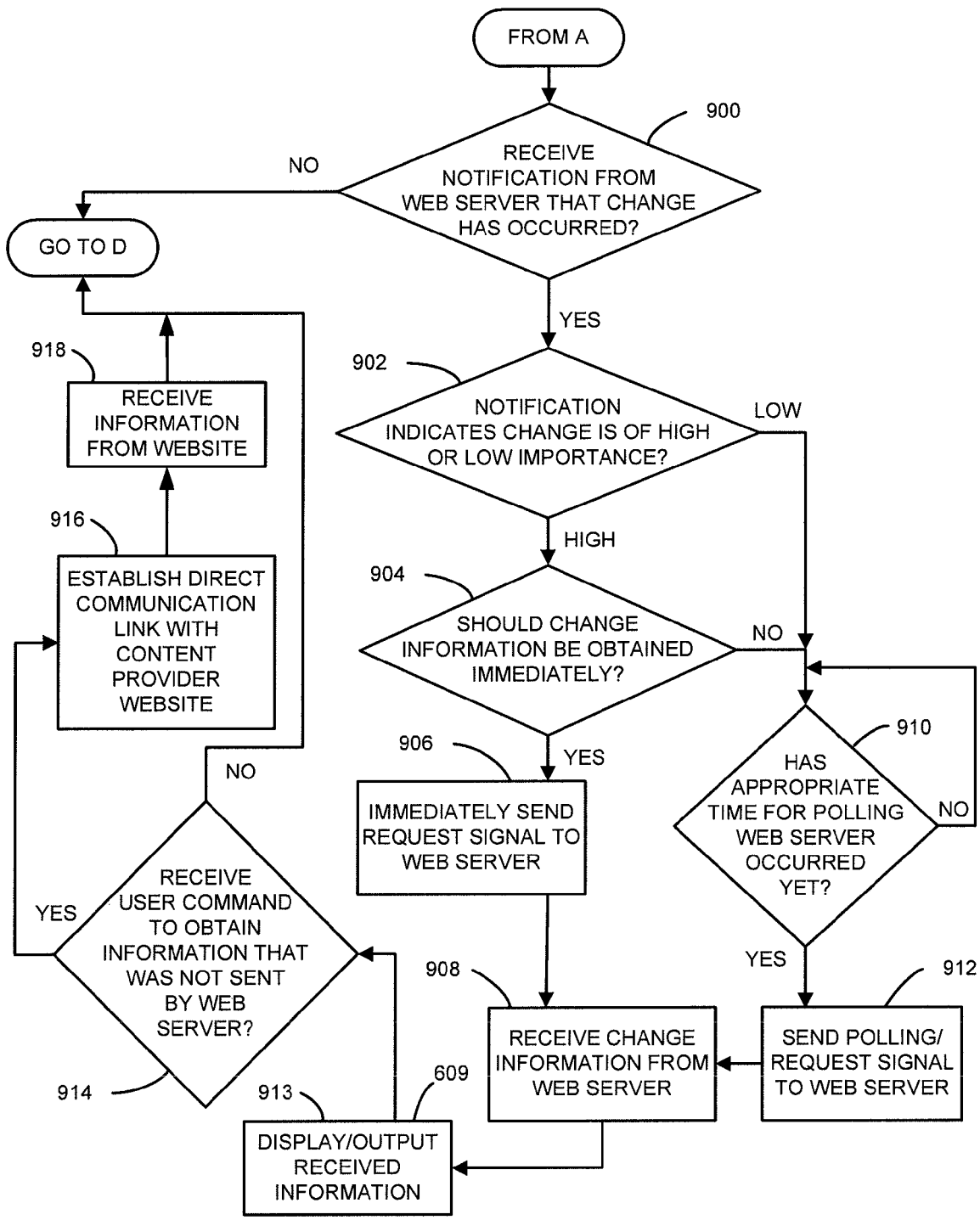

Turning to FIGS. 8 and 9, respectively, in further embodiments the operations performed by the web server 104 and the mobile device 102 can differ somewhat from those shown in FIGS. 4-7. More particularly, in some other embodiments, rather than performing the steps 408-416 between a node B and a node C shown in FIG. 4, the web server 104 instead operates in a different manner involving steps 800-814 shown in FIG. 8. As shown, upon proceeding from the node B, rather than performing the processing step 408 (and corresponding steps shown in FIG. 5) the web server 104 instead performs steps 800, 802 and 804. At the step 800 in particular, the web server 104 determines whether a change has occurred between information just obtained/pulled from the CPW 106 in the step 406 and information previously received from that CPW at an earlier time. If change(s) are detected at the step 802, then at a step 804 the front end portion 308 of the web server 104 places that change information into a change list. Where these steps are performed repeatedly in relation to multiple CPWs with which the web server 104 is in contact, the change information detected in relation to each of the CPWs can be all be put into the change list, which can in that case be termed a common change list.

Next, at a step 806, the front end portion 308 of the web server 104 determines whether the processed information is of high importance or not of high importance (e.g., low importance). In performing this determination, the same considerations can be taken into account as were discussed above in relation to the step 410 of FIG. 4, and for that reason the step 806 is also labeled as the step 410 in FIG. 8. Depending upon whether the processed information is determined to be of high importance or low importance, the process then advances either to the step 808 or the step 810, respectively. In the step 808, upon having determined that the processed information is of high importance (e.g., the information concerns a status update), the front end portion 308 of the web server 104 sends a notification to the mobile device 102 via the push channel indicating that a high importance change has occurred. Likewise, at the step 810, upon having determined that the processed information is of low importance, the front end portion 308 of the web server 104 sends a notification to the mobile device 102 also via the push channel indicating that a low importance change has occurred.

Once the notifications have been sent in either of the steps 808 or 810, then at a step 812 the front end portion 308 of the web server 104 at a later time can receive a request from the mobile device 102 to send the change information itself. The request can be received at any time as determined by the mobile device 102. Often, if the change information is of high importance, the mobile device 102 will immediately or very soon after receiving the notification at the step 808 send the request for the information. In contrast, if the change information is of low importance, the mobile device will often wait until a predetermined time (e.g., a periodic or non-periodic polling time) for such a request has been attained. For example, the device may wait no more than 5 minutes to request high importance information and wait 15-30 minutes between requests to download the low importance information. In any event, upon a request for transmission of the change information being received from the mobile device 102 at the step 812, then the requested change information is subsequently sent by the front end portion 308 of the web server 104 to the mobile device 102. In the present example, it is preferable that this change information is not sent by the push channel, or alternatively that only high-importance change information is sent by the push channel, to reduce the amount of time the mobile device is powered up to receive the change content, though it is recognized that in other embodiments all of the change information can be sent via the push channel.

Upon the sending of this information at the step 814, or if no request for information is received (or at least not received within a predetermined time period) at the step 812 or if no change was detected in the information received from the CPW 106 at the step 802, then the process returns to the node C (and thus to the step 418) of FIG. 4. It will be recognized that, should no content be required for uploading to the CPW, the web server 104 will typically repeatedly return to step 406 as it will continue to pull content from the CPW independently of whether content is being uploaded to the mobile device 102 client.

Although in the present example, notifications of change information are provided in the same manner by way of the push channel at the steps 808 and 812 regardless of whether the change information is of high importance or of low importance, this need not always be the case. In other embodiments, for example, a notification regarding a high importance change can be sent more promptly than, or in some other manner than, a notification regarding a low importance change. Further, while in the present example of FIG. 8 the sending of the change information at the step 814 occurs at a different time than the sending of the notifications at the steps 808, 810, this need not always be the case. For example, in one other embodiment, in the event the content of high-importance change information is small (e.g., a text message of less than 100 characters), that content can be provided along with (or even serve as) the notification of the high importance change. From the above description, it should also be apparent that in at least some embodiments the operation of the back end portion can be largely or entirely independent from the operation of the front end portion in terms of the different portions' respective communications with the CPW 106 and the mobile device 102. A variety of different types of communications, for example those involving pulling or polling, or periodic or asynchronous communications, can be employed by either end portion irrespective of the operations of the other end portion depending upon the embodiment. Thus, the back end portion 306 can continuously pull content from CPWs 106 and send changes to the front end portion 308 independent of what the front end portion is doing. The front end portion 308 can likewise push to the mobile device 102 and wait for requests to download change content, or synchronize the web server 104 and mobile device, without concern to what the back end portion 306 is doing at any particular moment.

As for FIG. 9, the flow chart provided therein shows how in some other embodiments, rather than performing the steps 604-609 between the node A and a node D shown in FIG. 6, the mobile device 102 instead operates in a different manner involving steps 900-914. The steps 900-914 performed by the mobile device 102 shown in FIG. 9 are particularly complementary with respect to the steps 800-814 performed by the web server 104 shown in FIG. 8. As shown in FIG. 9, upon proceeding from the node A, rather than performing the receiving step 604 of FIG. 6, the mobile device 102 instead can receive a notification from the web server 104 (sent at one or both of the steps 808, 810) that one or more change(s) have been detected in the information provided most recently and at an earlier time from the CPW 106. If a notification is received at the step 900, then at the step 902 the mobile device 102 determines whether the notification indicates that the change is of high or low importance.

If at the step 902 it is determined that the change is of high importance, then the mobile device 102 at the step 904 determines whether the high importance change information should be immediately obtained from the web server 104. Although in some embodiments it is always the case that high importance change information should be obtained as soon as possible, in other embodiments the mobile device can still for various reasons determine that it would preferable to defer attempting to obtain that information from the web server (e.g., because the mobile device is low on power). Assuming that at the step 904 the mobile device 102 determines that the change information should be obtained immediately, then the process advances to the step 906 at which the mobile device immediately sends a request signal to the web server requesting that the high importance change information be provided to the mobile device right away. In response, at a step 908, the mobile device 102 ultimately receives the requested change information (or at least some of that information, as determined by the web server 104) from the web server. In this regard, the performing of the step 908 complements the performing of the step 814 of FIG. 8.

If alternatively at the step 902 it is determined by the mobile device that the notification indicates that the change information is of low importance, or if at the step 904 the mobile device determines that the change information should (or need) not be obtained immediately, then the process instead advances to the step 910. At the step 910, the mobile device 10 further determines whether an appropriate time for polling the web server 104 for change information has occurred. Such an appropriate time can be a periodically-occurring time or, in other embodiments, can be determined by the mobile device 102 based upon a variety of other considerations (e.g., a predetermined amount of time has elapsed since another event, or a user command as been received instructing the mobile device to obtain content information from the web server 104).

If at the step 910 the appropriate time for polling the web server has not yet occurred, then the process can repeat that step until such time occurs (or can advance to another step of the process and/or possibly return to the step 910 at a different time). If however at the step 910 the appropriate time has occurred, then the process advances to the step 912, at which a polling/request signal is sent by the mobile device 102 to the web server 104. Upon the sending of that signal, the process returns to the step 908 at which the mobile device 102 receives the requested change information. Further as shown in FIG. 9, upon completion of the step 908 the mobile device 102 proceeds to perform the step 913 in which the received information is displayed or otherwise output by the mobile device 102 to allow for review of the information by a user of the mobile device. The step 913, as shown, can be identical or similar to the step 609 of FIG. 6.

While the change information sent by the web server 104 at the step 908 is often of greatest interest to a user of the mobile device 102, this change information often excludes a variety of content (as well as formatting) information that was originally available at the CPW 106 prior to processing of that information by the web server. That is, while the information provided by the web server 104 can include various content such as happenings, recent status information, comments from others, etc., and while the mobile device 102 can also as matter of course display certain standard information as part of its user interface (e.g., the name of the user, the CPW with which the user is contact, etc.), significant amounts of content and/or other information can be excluded due to the intermediation of the web server 104. For this reason, upon the display of the change information at the step 913, a user may decide that it would be desirable not only to obtain the change information but also to obtain other content (or even formatting) information. Given that a user may wish to obtain such other information, the mobile device at the subsequent step 914 further determines whether a user command to obtain other information not received from the web server 104 at the step 908 has been received. Such a command can be received, for example, when a user selects an icon displayed by the mobile device, which might be displayed as part of the change information at the step 913.

If it is determined at the step 914 that such a command was received, then the mobile device 102 at a step 916 establishes a direct communication link with the CPW 106. This operation of establishing the direct communication link can be identical or similar to the operation associated with the step 624 discussed above, and can involve standard web-based client-server communications (e.g., involving the input/transmission of a uniform resource locator (URL) and/or interfacing with web pages of the CPW 106) that are designed to both establish the communication link and elicit the other information that was desired by the user. Thus, upon establishment of the direct communication link at the step 916, then at the step 918 the other information desired by the user is received from the CPW 106. Upon completion of the step 918, as well as in the event no user command was determined to have been received at the step 914 or in the event notification from the web server 104 was received at the step 900, then the process returns to the node D and continues on with the step 610 of FIG. 6.

In another alternate embodiment of the invention, the back end portion 306 includes a plurality of plug-ins, or processors, each of which is associated with a respective CPW 106. Each plug-in includes application programming interfaces (APIs) for its associated CPW 106. Each plug-in uses hypertext transfer protocol (HTTP) to persistently pull information from its respective CPW 106. When changes are detected by the back end portion 306 plug-ins, the changes are loaded into a queue and the front end portion 308 pushes a notification to the mobile device 102. All of the plug-ins in the back end portion 306 will continue to load the queue with information formatted according to a common format that includes, for example, the ID of the source of the information (the source CPW identification), the account ID of the mobile device (user device), the content type, the priority, and the information. For status, for example, the format can be: type (STATUS, MOOD, STATUS_AND_MOOD), action (clear status or update status), provider, aggregation service account id, external id, friend id if the update is for a friend, status text, post date and time. The web server 104 builds a unified feed for each user device (or user account) by combining the content pulled by all of the plug-ins into a common change list for each respective device (or user account). The content is built over time, and each entry can be time stamped.

The following algorithm can be used for detecting a change during server sync, with server sync being understood to involve syncing of the web server 104 with a CPW 106 (by comparison, client sync can be understood to involve syncing of a client such as the mobile device 102 with the web server). The web server 104 program maintains three numbers for each account: cla, w1, and w2. The cla is the change list anchor, w1 is the beginning time (sample) of the change list window, and w2 is the end time (sample) of the change list window. The web server 104 stores the portion of the change list that falls inside the window [w1,w2]. All changes found during a server sync (i.e., the back end portion pulling from the CPW) are stamped with a sync anchor equal to the current w2 (i.e., before w2 is incremented by 1). The program suspends server sync (CPW size sync) once the window size reaches or exceeds the maximum window size mw. Once suspended, the server will resume server sync when a new client poll is received. The other variables are ca is the client anchor, OFF is a flag indicating no sync activity. The values of cla, w1, and w2 are updated according to the following state transition rules:

| Event | State transitions |
| --- | --- |
| initialization | cla = 0, w1 = 0, w2 = 0, off = 0 |
| server sync | w2 = w2 + 1, off = 1 if w2 − w1 >= mw |
| client sync, w1 <= ca <= w2 | w1 = ca, off = 0 |
| client sync, cla < w1 and (ca < w1 or ca > w2) | cla = w2 + 1, w1 = cla, w2 = cla, off = 0 (aka "change list reset") |

When the client polls for changes, if the client anchor ca falls inside [w1, w2], then a partial sync will work and the web server 104 sends back changes that fall within [ca, w2] (and deletes changes older than ca). At the conclusion of the sync, ca will be updated. If when the client polls for changes, the client anchor fell outside of [w1, w2], a new full sync will occur between the web server 104 and the client program in mobile device 102.

It is envisioned that server sync (the back end plug-ins pulling content for a particular device 102) can be suspended for a particular mobile device 102 account when the window size reaches mw, in which case a few missed pushes (notifications to the device) may cause service outage for a device in the absence of client polling. It is envisioned that it may be advantageous to send pushes if there are pending changes since last w2, where pushes can be sent as long as there are pending changes since wt.

It is further envisioned that the intermediary web server 104 described herein can be advantageously employed with the device polling manager described in U.S. provisional application No. 61/180,301, entitled A MOBILE COMPUTING DEVICE AND METHOD WITH ENHANCED POLING MANAGEMENT, filed on May 21, 2009, which is hereby incorporated by reference herein.

Photo uploading will now be described as an example of uploading content. The intermediary web server 104 can be employed to optimize a process of uploading photos from a mobile device 102 to multiple CPWs 106, which in this example are social networking systems, by caching the photos at an intermediate web server 104 memory 302. An exemplary flow can be as follows:

1. The web server front end indicates to the back end portion that a user device uploaded a photograph;
2. The web server front end or back end will give the new photo a photo URL and a system wide unique photo ID;
3. The photo ID is downloaded to the device, responsive to which the device client program associates the photo ID with the photo name;
4. The back end portion downloads the file over HTTP to a location such as /tmp/uniquephotoid.tmp;
5. The respective back end portion plug-ins associated with each of the target CPWs submit work.uploadPhoto for each CPW to upload this photo file;
6. The back end portion provides a report back to the front end portion of the success or failure of the photo share;
7. The front end can optionally notify the user device of the success or failure;
8. After a predetermined time period has passed, the photograph is deleted.

In operation, the photographs from the mobile device 102 are uploaded from the device to the front end portion 308. The front end portion 308 or the back end portion 306 caches the photos in the intermediate web server memory 302 for a predetermined time period to allow the same photo to be submitted to the web sites of different systems without requiring the photo to be uploaded again by the mobile device. After the predetermined time period, the photo will be erased. The predetermined period may be any time period, and is selected according to the memory constraints and the frequency of use. The time period may for example be 24 hours, which time period can start at the time the photograph is upload to the memory, whereby the time period is set once the picture is uploaded, or the time period may start upon the uploading of the photograph to a CPW, whereby the time period will be extended each time the picture is uploaded to a new CPW.

For one exemplary embodiment, a photograph is uploaded from mobile device 102 as an action, along with the identification of a specified CPW 106, to the server front end portion 308 and stored in temporary storage of the network server. The front end portion 308 forwards the photo to a plug-in in the back end portion 306 of the server 104 that can for example be dedicated to the CPW 106 specified by the mobile device 102. The network server front end portion 308 also sends a message including a photo identification (ID) associated with the saved photograph back to the mobile device 102. The photo ID identifies a location or pointer to the location where the photo is stored at the web server memory 302. The mobile device 102 associates (maps) the photo ID with the name of the photo. Subsequently, if the mobile device 102 elects via the user interface to send the same photo to a different CPW (e.g., a different social networking system), the mobile device will send the photo ID, instead of the actual photo, to the web server 104. In response the web server 104 will retrieve the photo and forward it to another plug-in dedicated to the other CPW. It is envisioned that once the photo is removed from the memory 302, an update will be sent to the mobile device 102 to remove the association of the photo name and the photo ID, so that the mobile device will upload the photograph. If on the other hand the photo is no longer stored, and the web server 104 receives a request to upload the photo associated with the photo ID, the front end portion 308 will send an error message to the subscriber mobile device responsive to which the subscriber device will be invited to upload the photo again.

For other embodiments, the web server back end portion 306 will determine whether the photo uploaded from the mobile device 102 is within the requisite limitations (e.g., dimensions and size) of the target CPW (e.g., social networking system). It is envisioned that this can be processed by the plug-in associated with each CPW when a picture is removed from the memory 302, as each plug-in can store the CPW's limitations on photographs. If the limitations are met, the back end portion can send the photo through to the target CPW. Otherwise, the photo will be resized according to the requirements of the CPW. In order to resize the photograph, and/or scale the photo to a target size, a resize factor is determined. A particularly advantageous algorithm that can be used to determine the resize factor X is as follows:

$$x/100 = ((t-f)/(kc))^{\wedge}(0.5)$$

where x is the resize percent t is the target size in bytes, and may for example be approximately 1 megabyte or less, and can advantageously be less then 200,000 bytes, and in one implementation was 100,000 bytes.

f is a small fudge factor for the file size k is a constant factor, and may be less than 1, and can advantageously be less then 0.5, and in one implementation was selected to be 0.23.

c is the original file's size in bytes.

By storing a photograph in the web server 104, the server helps reduce power consumption in the device and bandwidth burdens on the communication network by permitting the mobile device to send media to different CPWs at different times while uploading the media only once through the local area network or wide area network over which the mobile device 102 communicates. Additionally, the web server 104 can adopt the media to the format desired by each CPW, and the mobile device 102 need not know or accommodate these requirements to successfully upload the media.

It is also envisioned that photographs can be downloaded to the mobile devices via the intermediary web server. For example, for RSS news feeds, photos from an RSS content source are pulled by the back end portion from the news feed, along with a news feed summary. When the back end portion 306 detects that such news information is new, or in other words that a change has occurred since the previous RSS news feed was pulled from this CPW by the back end portion, the back end portion of the server 104 will transmit to the front end portion 308 a feed properly formatted for the client mobile device 102. The front end portion 308 will generate a low priority push notification to the client device 102 and the queue for the device 102 will be loaded with the summary and the photograph. When the client device 102 thereafter sends a polling request to the front end portion 308 for content, the front end portion will transmit the contents of the queue including the news feed, which contains the formatted picture and the summary. The client program on the mobile device 102 will display the summary and associated picture on the mobile device 102 display 216. The back end portion 306 thus detects and formats the new picture and summary for the device, and the front end portion 308 notifies the device that content is available and responds to a polling request from the device to download the news feed to the mobile device 102. In addition to the above-described operation, in at least one additional embodiment, if the input 210 includes a touch sensor over the display (commonly referred to as a touchscreen), the user can touch the screen at the summary and picture and the user interface will connect directly through link 110 to the CPW associated with the news feed summary/picture and load additional information regarding the news feed on the display 216 for viewing by the user.

It is further envisioned that the client program in the mobile device 102 will store some definitions regarding the content types and characteristics for each CPW with respect to which the user has a server account. The user interface of the mobile device will vary depending on which accounts the user sets up on the server. For example, assume the user enters Facebook™ and Twitter™ on their web server 104 account. When the user interacts with user interface to construct a message to be uploaded to a CPW, the user interface display presents a choice of "Facebook", "Twitter" or "ALL" for the target CPW where the message will be sent. Depending on which selection is made, the parameters for the message may be different (e.g., the number of characters). If the user selects all, the length will be the shorter of the two CPW limitations. It is further envisioned that a length count and warning can be provided. As the user enters text, the remaining characters permitted before the limit is reached are displayed. At some threshold, such as 30 characters, a warning will be displayed. When the limit is exceeded, the remaining characters will go to a negative count, or the user will be prevented from inputting additional characters. In the event that the user changes the destination CPW, the limit will change appropriately. For example, if Twitter™ website is added as a destination after the message is created, the limit will be reduced. If Twitter™ website is removed as a destination, the limit increased.

The mobile device 102 generates a user interface display having operating parameters dependent on the one or more CPWs to which the user device set up on the intermediary web server 104. For messages, a generic message entry field is presented on a display for the user to input text, the size upper limit based on the smallest maximum message size permitted by the one or more CPWs selected to be the destination of the message text. The limit can be retained on the client mobile device. The mobile device client program can generate a warning when the message size gets within a predetermined amount of the limit. The limit changes if the one or more CPWs changes. The content from the user interface input populates the message input area, and can generate a warning when the limit is reached. The client program transmits the message to the server front end portion with the identity of the one or more CPWs. The back end portion formats the message for the one or more destination CPWs and uploads the message in the format desired by the CPW.

From the above description, it should be evident that a variety of methods employing numerous different operational steps such as those discussed above, are encompassed by the present invention. Additionally, a variety of alternate embodiments are also intended to be encompassed by the present invention in addition to the specific embodiments discussed above, including embodiments employing methods having other operational steps in addition to or instead of those discussed above, as well as embodiments employing methods with steps in a variety of orders and combinations in addition to or instead of the particular orders or combinations of steps discussed above. Further it should be evident that systems in accordance with one or more of the embodiments described above are able to provide enhanced functionality in several regards in terms of facilitating interactions between mobile devices operated by users and social networking websites. Depending upon the embodiment, any one or more of the quality of communications between users and social networking websites, the user-friendliness of social networking websites and associated transactions as experienced by mobile device users, and/or the efficiency of communications between mobile devices and such websites can be enhanced.

It is specifically intended that the present invention not be limited to the embodiments and illustrations contained herein, but include modified forms of those embodiments including portions of the embodiments and combinations of elements of different embodiments as come within the scope of the following claims.

We claim:

1. In a mobile device, a method of interacting with a first social networking website and a second social networking website by way of a network, the method comprising:

(a) communicating indirectly with the first social networking website by interacting with an intermediate web server by way of the network, the intermediate web server in turn being in communication with the first social networking website;

(b) receiving, from the intermediate web server, notifications and first information, wherein the mobile device receives at least some of the notifications in an asynchronous manner off of the network via a push channel from the intermediate web server at times determined by the intermediate web server, and wherein the mobile device receives the first information following a pull request;

(c) communicating indirectly with a second social networking website also by interacting with the intermediate web server by way of the network, the intermediate web server in turn being in communication with the second social networking website, wherein the mobile device receives the first information from the first social networking website by way of the intermediate web server;

(d) displaying on the mobile device each of the first and second information in a format that is standardized and excludes at least some formatting information that would be present if the mobile device had received the first and second information based upon communications with the first and second social networking websites directly in a manner not involving the intermediate web server;

(e) determining, based at least in part upon a user input received at the mobile device, that the mobile device should communicate directly with the first social networking website in a manner not involving the intermediate web server; and (f) communicating with the first social networking website directly in the manner not involving the intermediate web server.

2. The method of claim 1, wherein the network is an internet-type communication network that includes at least one wireless communication link.

3. The method of claim 1, further comprising:
(g) further determining that the mobile device should again communicate indirectly with the first social networking website by interacting with the intermediate web server; and
(h) further communicating indirectly with the first social networking website by interacting with the intermediate web server by way of the network, the intermediate web server in turn being in communication with the first social networking website.

4. The method of claim 1, wherein the communicating in step (f) is conducted simultaneously with additional communicating of the mobile device indirectly with the first social networking website by interacting with the intermediate web server.

5. The method of claim 1, wherein the push channel is further established by the intermediate web server, and wherein the push channel employs one of more of a transmission control protocol (TCP), an extensible messaging and presence protocol (XMPP), and an asynchronous communications technique.

6. The method of claim 5, wherein at least some additional communications of the mobile device in relation to the web server involve web services calls, and the at least some additional communications allow for data transfer between the mobile device and the web server.

7. The method of claim 1, wherein the first information lacks at least some formatting information that would be present if the first information had been received by the mobile device directly from the first social networking website.

8. The method of claim 1, wherein the mobile device receives from the intermediate web server a common changelist with updates from a plurality of content providers and updates the information provided to the user from the common changelist.

9. The method of claim 1, wherein the first information includes difference information indicative of one or more changes that have occurred in content available from the first social networking website at two different times.

10. The method of claim 1, wherein the first information includes at least one of message information, friend identification information, status update information, happenings information, and news.

11. The method of claim 1, wherein the mobile device receives the first information in response to polling signals transmitted from the mobile device onto the network for receipt by the intermediate web server.

12. The method of claim 1, wherein the communicating in (a) includes transmitting a picture file for receipt by the intermediate web server, receiving an identifier back from the intermediate web server for identifying the picture to the server and the device.

13. The method of claim 1 wherein, as part of the communicating in step (a) or the receiving in step (b), the mobile device receives both content information and an identifier indicative of which of a plurality of social networking websites including the first social networking website supplied the content information.

14. The method of claim 1, wherein as part of the communicating in (a), the mobile device transmits content information for receipt by the web server and additionally transmits an instruction for receipt by the web server that instructs the web server to additionally share at least some of the content information with a second social networking website.

15. The method of claim 1, further comprising:
displaying on a screen of the mobile device at least one input entry feature, wherein the at least one input entry feature includes at least one of an input button, a text field into which text can be entered, and a selectable icon, and wherein the communicating in (a) includes transmitting information received at the mobile device as entered by a user by way of interaction with the at least one input entry feature.

16. The method of claim 1, wherein the user input is indicative of a request for additional information from the first social networking site that cannot be provided to the mobile device by way of the intermediate web server, and wherein the mobile device automatically proceeds to step (f) upon completing the determining in step (e).

17. In a mobile device, a method of interacting with a first content provider website and a second content provider website by way of a network, the method comprising:
(a) communicating indirectly with the first content provider website by interacting with an intermediate web server by way of the network, the intermediate web server in turn being in communication with the first content provider website;
(b) communicating indirectly with a second content provider website also by interacting with the intermediate web server by way of the network, the intermediate web server in turn being in communication with the second content provider website;
(c) receiving, from the intermediate web server, notifications, first information, and second information, wherein the mobile device receives the first information from the first content provider website by way of the intermediate web server and receives the second information from the second content provider website by way of the intermediate web server;
(d) determining, based at least in part upon a user input received at the mobile device, that the mobile device should communicate directly with the first content provider website in a manner not involving the intermediate web server; and
(e) communicating with the first content provider website directly in the manner not involving the intermediate web server.

18. The method of claim 17, further comprising:
displaying on the mobile device each of the first and second information in a format that is standardized and excludes at least some formatting information that would be present if the mobile device had received the information based upon communications with the websites directly in a manner not involving the intermediate web server, wherein the mobile device receives at least some of the notifications in an asynchronous manner off of the network via a push channel from the web server at times determined by the intermediate web server, and wherein the mobile device receives first information following a pull request.

19. The method of claim 18, further comprising:
providing a user interface by way of the mobile device, wherein the user interface presents a choice of a plurality of content provider websites including the first content provider website and the second content provider website;
receiving at the mobile device a first selection of one or more of the plurality of the content provider websites;
determining a first parameter pertaining to a first type of message to be entered via the user interface based upon the first selection;
further receiving at the mobile device a second selection of one or more of the plurality of the content provider websites, the second selection being different than the first selection; and
determining a second parameter pertaining to the first type of message to be entered via the user interface, wherein the second parameter differs from the first parameter based upon the second selection; and
receiving a message of the first type in accordance with at least one of the first and second parameters.

20. In a mobile device, a method of interacting with a first social networking website and a second social networking website by way of a network, the method comprising:
(a) communicating indirectly with the first social networking website by interacting with an intermediate web server by way of the network, the intermediate web server in turn being in communication with the first social networking website;
(b) receiving from the intermediate web server, notifications and first information, wherein the mobile device receives the first information following a pull request, wherein the mobile device receives the first information from the first social networking website by way of the intermediate web server, and wherein the first information lacks at least some formatting information that would be present if the first information had been received by the mobile device directly from the first social networking website;
(c) communicating indirectly with a second social networking website also by interacting with the intermediate web server by way of the network, the intermediate web server in turn being in communication with the second social networking website by way of the intermediate web server;
(d) displaying on the mobile device each of the first and second information in a format that is standardized;
(e) determining, based at least in part upon a user input received at the mobile device, that the mobile device should communicate directly with the first social networking website in a manner not involving the intermediate web server; and
(f) communicating with the first social networking website directly in the manner not involving the intermediate web server.

21. The method of claim 20, wherein the mobile device receives at least some of the notifications in an asynchronous manner off of the network via a push channel from the intermediate web server at times determined by the intermediate web server, and
wherein the first information is in a compressed format.

22. The method of claim 10, wherein the first information is in a compressed format.

* * * * *